US011803756B2

(12) United States Patent
Yang

(10) Patent No.: US 11,803,756 B2
(45) Date of Patent: Oct. 31, 2023

(54) NEURAL NETWORK SYSTEM FOR RESHAPING A NEURAL NETWORK MODEL, APPLICATION PROCESSOR INCLUDING THE SAME, AND METHOD OF OPERATING THE SAME

(71) Applicant: Samsung Electronics Co., Ltd., Suwon-si (KR)

(72) Inventor: Seung-soo Yang, Hwaseong-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 860 days.

(21) Appl. No.: 16/006,211

(22) Filed: Jun. 12, 2018

(65) Prior Publication Data

US 2019/0080239 A1  Mar. 14, 2019

(30) Foreign Application Priority Data

Sep. 13, 2017 (KR) .................. 10-2017-0117236

(51) Int. Cl.
*G06N 3/063* (2023.01)
*G06N 3/082* (2023.01)
*G06N 3/045* (2023.01)

(52) U.S. Cl.
CPC ............. *G06N 3/082* (2013.01); *G06N 3/045* (2023.01); *G06N 3/063* (2013.01)

(58) Field of Classification Search
CPC ....... G06N 3/082; G06N 3/0454; G06N 3/063
See application file for complete search history.

(56) References Cited

U.S. PATENT DOCUMENTS 5,583,771 A   12/1996 Lynch et al.
6,392,550 B1   5/2002 Najor
(Continued)

FOREIGN PATENT DOCUMENTS

EP        695668 B1    12/1997
JP    H10334070 A    12/1998
(Continued)

OTHER PUBLICATIONS

Ying Wang, Huawei Li and Xiaowei Li, "Real-time meets approximate computing: An elastic CNN inference accelerator with adaptive trade-off between QoS and QoR," 2017 54th ACM/EDAC/IEEE Design Automation Conference (DAC), Austin, TX, USA, 2017, pp. 1-6, doi: 10.1145/3061639.3062307. (Year: 2017).*
(Continued)

*Primary Examiner* — Kakali Chaki
*Assistant Examiner* — Johnathan R Germick
(74) *Attorney, Agent, or Firm* — Harness, Dickey & Pierce, P.L.C.

(57) ABSTRACT

A method of operating a neural network system includes parsing, by a processor, at least one item of information related to a neural network operation from an input neural network model; determining, by the processor, information of at least one dedicated hardware device; and generating, by the processor, a reshaped neural network model by changing information of the input neural network model according to a result of determining the information of the at least one dedicated hardware device such that the reshaped neural network model is tailored for execution by the dedicated hardware device.

21 Claims, 20 Drawing Sheets

(56) References Cited

U.S. PATENT DOCUMENTS

| | | | |
|---|---|---|---|
| 7,827,031 | B2 | 11/2010 | Albesano et al. |
| 9,130,651 | B2 | 9/2015 | Tabe |
| 2016/0085690 | A1 | 3/2016 | Kim et al. |
| 2016/0322042 | A1 | 11/2016 | Vlietinck et al. |
| 2016/0328644 | A1* | 11/2016 | Lin .................. G06N 3/084 |
| 2016/0358068 | A1 | 12/2016 | Brothers et al. |
| 2017/0103298 | A1 | 4/2017 | Ling et al. |

FOREIGN PATENT DOCUMENTS

| | | |
|---|---|---|
| JP | 2000-259598 A | 9/2000 |
| JP | 2001-256212 A | 9/2001 |
| KR | 10-2017-0005662 A | 1/2017 |

OTHER PUBLICATIONS

J. Yu, A. Lukefahr, D. Palframan, G. Dasika, R. Das and S. Mahlke, "Scalpel: Customizing DNN pruning to the underlying hardware parallelism," 2017 ACM/IEEE 44th Annual International Symposium on Computer Architecture (ISCA), Toronto, ON, Canada, 2017, pp. 548-560, doi: 10.1145/3079856.3080215. (Year: 2017).*

Li Du and Yuan Du and Yilei Li and Mau-Chung Frank Chang (2017). A Reconfigurable Streaming Deep Convolutional Neural Network Accelerator for Internet of Things. CoRR, abs/1707.02973. (Year: 2017).*

F. Tu, S. Yin, p. Ouyang, S. Tang, L. Liu and S. Wei, "Deep Convolutional Neural Network Architecture With Reconfigurable Computation Patterns," in IEEE Transactions on Very Large Scale Integration (VLSI) Systems, vol. 25, No. 8, pp. 2220-2233, Aug. 2017, doi: 10.1109/TVLSI.2017.2688340. (Year: 2017).*

Park, H., Kim, D., Ahn, J., & Yoo, S. (2016). Zero and Data Reuse-Aware Fast Convolution for Deep Neural Networks on GPU. In Proceedings of the Eleventh IEEE/ACM/IFIP International Conference on Hardware/Software Codesign and System Synthesis. Association for Computing Machinery. (Year: 2016).*

Office Action for Korean Application No. 10-2017-0117236 dated Aug. 23, 2023.

* cited by examiner

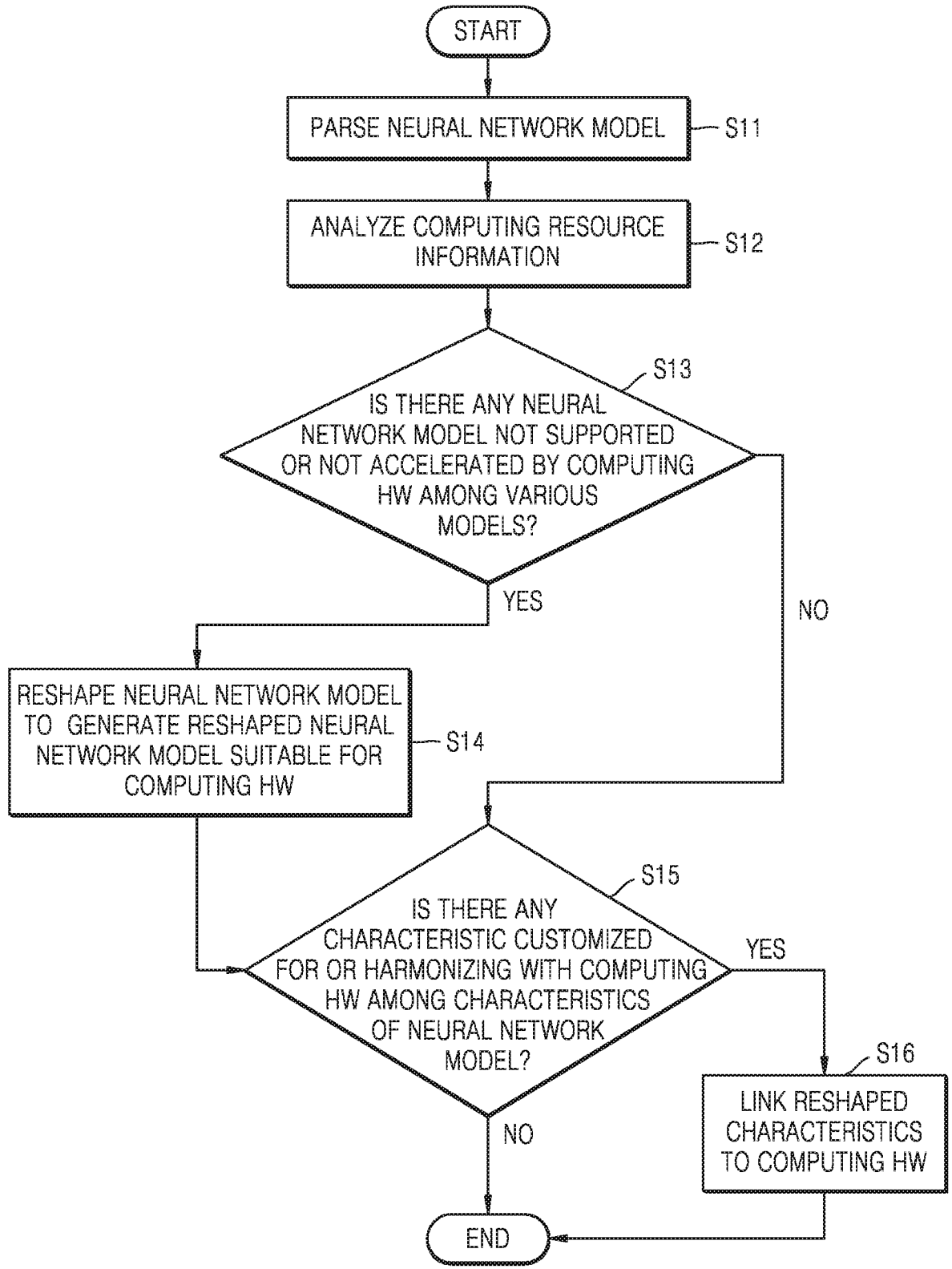

FIG. 14A
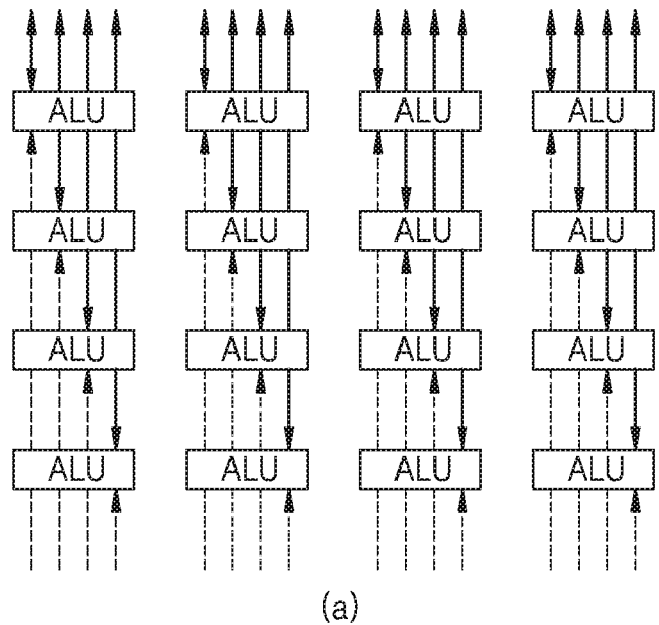
(a)
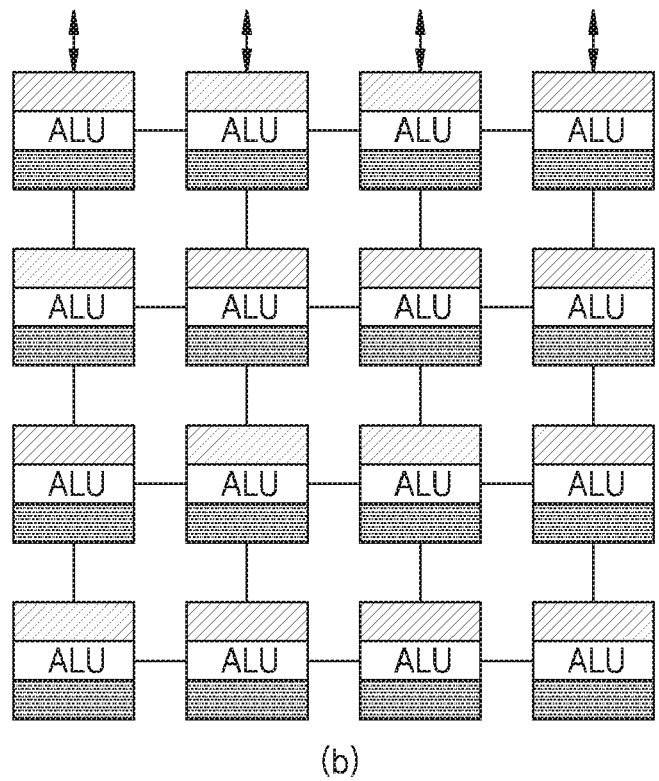
(b)

NEURAL NETWORK SYSTEM FOR RESHAPING A NEURAL NETWORK MODEL, APPLICATION PROCESSOR INCLUDING THE SAME, AND METHOD OF OPERATING THE SAME

CROSS-REFERENCE TO RELATED APPLICATION

This application claims the benefit of priority under 35 U.S.C. § 119 to Korean Patent Application No. 10-2017-0117236, filed on Sep. 13, 2017, in the Korean Intellectual Property Office, the disclosure of which is incorporated herein in its entirety by reference.

BACKGROUND

At least one example embodiment of the inventive concepts relates to a neural network system, and more particularly, to a neural network system for reshaping a neural network model, an application processor including the neural network system, and a method of operating the neural network system.

A neural network refers to a computational architecture which is a model of a biological brain. As neural network technology has recently been developed, there has been a lot of research into analyzing input data and extracting valid information using a neural network device, which uses at least one neural network model, in various kinds of electronic systems.

Various kinds of neural network models including a deep running algorithm have been developed and may be executed in various kinds of hardware. However, when the characteristic of a neural network model (e.g., an operating characteristic of using a weight) is not optimized for hardware, hardware resources may be wasted or an operating speed may be decreased.

SUMMARY

According to at least some example embodiments of the inventive concepts, a method of operating a neural network system includes parsing, by a processor, at least one item of information related to a neural network operation from an input neural network model; determining, by the processor, information of at least one dedicated hardware device; and generating, by the processor, a reshaped neural network model by changing information of the input neural network model according to a result of determining the information of the at least one dedicated hardware device such that the reshaped neural network model is tailored for execution by the dedicated hardware device. According to at least some example embodiments of the inventive concepts, an application processor includes memory storing computer-executable instructions; and a processor configured to execute the computer-executable instructions such that the processor is configured to perform operations including, determining information of at least one dedicated hardware device, and generating a reshaped neural network model by changing information of an input neural network model according to a result of determining the information of the at least one dedicated hardware device.

According to at least some example embodiments of the inventive concepts, a neural network system includes a neural network adaptor module configured to receive a first neural network model, determine information parsed from the first neural network model and information of a first dedicated hardware device, and generate a second neural network model by changing the first neural network model based on a result of the determining, the second neural network model being assigned to the first dedicated hardware device; and a neural network device including the first dedicated hardware device, the neural network device configured to perform an operation on input data according to the second neural network model to generate an information signal.

BRIEF DESCRIPTION OF THE DRAWINGS

The above and other features and advantages of example embodiments of the inventive concepts will become more apparent by describing in detail example embodiments of the inventive concepts with reference to the attached drawings. The accompanying drawings are intended to depict example embodiments of the inventive concepts and should not be interpreted to limit the intended scope of the claims. The accompanying drawings are not to be considered as drawn to scale unless explicitly noted.

FIGS. 7 through 10 are flowcharts of a method of operating a neural network adaptor module, according to at least one example embodiment of the inventive concepts;

FIGS. 14A through 14C are diagrams for illustrating examples in which a neural network model is reshaped according to operating characteristics of hardware;

DETAILED DESCRIPTION

Figure 1:
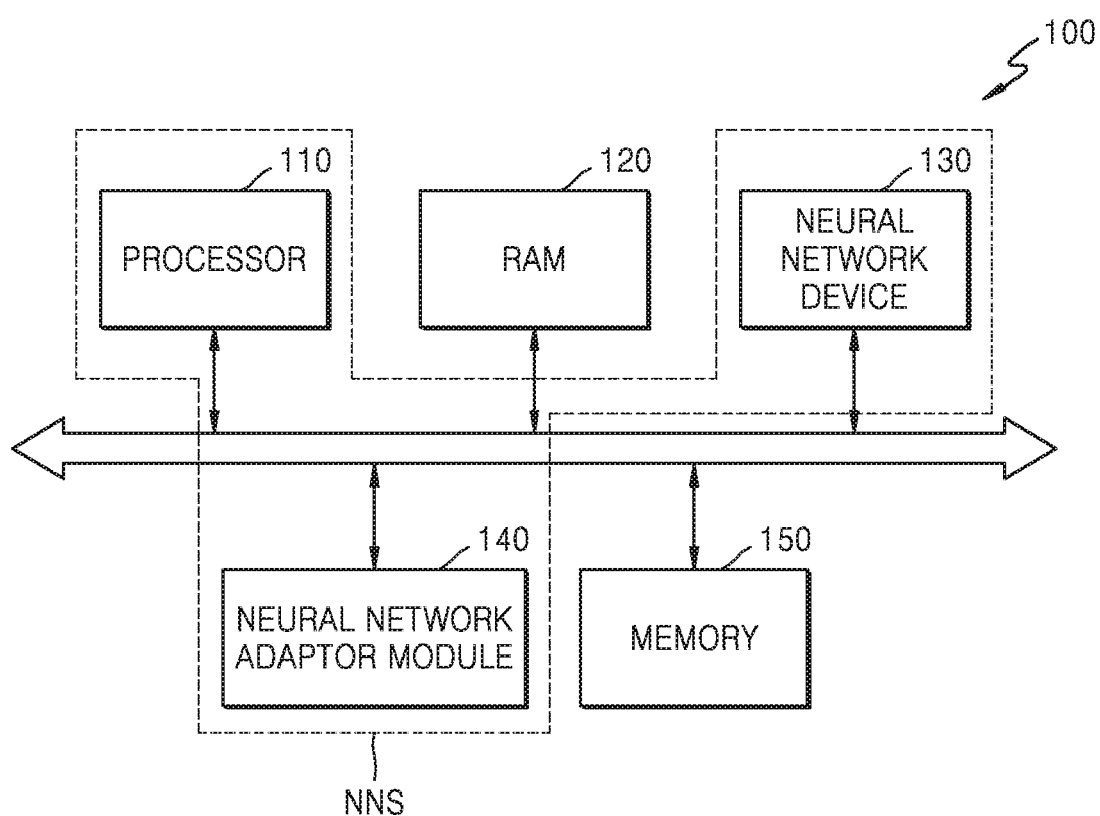
FIG. 1 is a block diagram of an electronic system including a neural network adaptor module, according to at least one example embodiment of the inventive concepts.

As is traditional in the field of the inventive concepts, embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the embodiments may be physically separated into two or more interacting and discrete blocks, units and/or modules without departing from the scope of the inventive concepts. Further, the blocks, units and/or modules of the embodiments may be physically combined into more complex blocks, units and/or modules without departing from the scope of the inventive concepts.

FIG. 1 is a block diagram of an electronic system 100 including a neural network adaptor module 140, according to at least one example embodiment of the inventive concepts. The electronic system 100 may analyze input data in real time based on a neural network, extract valid information, and determine a situation or control the elements of an electronic device mounted on the electronic system 100 based on the extracted information.

According to at least some example embodiments of the inventive concepts, electronic system 100 may be an application processor (AP) used in a mobile device or may be a computing system, a drone, a robotic device such as an advanced driver assistance system (ADAS), a smart television (TV), a smart phone, a medical device, a mobile device, an image display device, a measuring device, or an internet of things (IoT) device. The neural network adaptor module 140 may be applied to various systems. Hereinafter, it is assumed that the electronic system 100 is an AP. According to at least some example embodiments of the inventive concepts, The electronic system 100 may include a processor 110, random access memory (RAM) 120, a neural network device 130, the neural network adaptor module 140, and memory 150. According to at least some example embodiments of the inventive concepts, at least some elements of the electronic system 100 may be mounted on one semiconductor chip.

It may be defined that the electronic system 100 includes a neural network system (NNS) on the grounds that the electronic system 100 performs a neural network computing function. The NNS may include at least some elements included in the electronic system 100 in conjunction with neural network operation. For example, the NNS includes the processor 110, the neural network device 130, and the neural network adaptor module 140 in the example illustrated in FIG. 1, but at least one example embodiment of the inventive concepts is not limited thereto and other various kinds of elements involved in the neural network operation may be included in the NNS.

The processor 110 controls all operations of the electronic system 100. The processor 110 may include a single core processor or a multi-core processor. The processor 110 may process or execute programs and/or data stored in the memory 150. The processor 110 may control the function of the neural network device 130 by executing programs stored in the memory 150.

The RAM 120 may temporarily store programs, data, or instructions. Programs and/or data stored in the memory 150 may be temporarily stored in the RAM 120 according to the control of the processor 110 or booting code. The RAM 120 may be implemented as dynamic RAM (DRAM) or static RAM (SRAM).

The neural network device 130 may perform a neural network operation based on input data and may generate an information signal based on a result of the operation. Models of a neural network may include various kinds of models such as convolutional neural networks (CNNs), recurrent neural networks (RNNs), deep belief networks, and restricted Boltzmann machines but are not limited thereto. The neural network device 130 may include at least one processor (e.g., a dedicated processor) to perform operations according to neural network models. The neural network device 130 may also include separate memory (not shown) which stores programs corresponding to the neural network models.

An information signal may include one among various kinds of recognition signals such as a voice recognition signal, a thing recognition signal, an image recognition signal, and a biometric recognition signal. The neural network device 130 may receive frame data included in a video stream as input data and may generate a recognition signal with respect to a thing, which is included in an image represented by the frame data, from the frame data. However, at least one example embodiment of the inventive concepts is not limited thereto. The neural network device 130 may receive various kinds of input data according to the type or function of an electronic device mounted on the electronic system 100 and may generate an information signal according to the input data.

A neural network model may be executed by various kinds of hardware such as general hardware and dedicated hardware tailored or, alternatively, optimized for particular software. For example, various kinds of neural network models may be executed by general hardware such as a central processing unit (CPU) or a graphics processing unit (GPU), but the general hardware may be disadvantageous in terms of performance and power consumption as compared to dedicated hardware. When a particular neural network model is executed by dedicated hardware (e.g., an application specific integrated circuit (ASIC), a neural processing unit (NPU), a tensor processing unit (TPU), neural engine, etc.), it is advantageous in terms of performance and power consumption, but it may be disadvantageous in employing various kinds of neural network models.

The neural network adaptor module 140 may generate a reshaped neural network model using an input neural network model. For example, the neural network adaptor module 140 may receive various kinds of input neural network models and may generate a reshaped neural network model tailored or, alternatively, optimized for particular dedicated hardware with respect to the input neural network models. The neural network adaptor module 140 may also receive one input neural network model and generate a reshaped neural network model tailored or, alternatively, optimized for various kinds of dedicated hardware with respect to the input neural network model. In other words, the neural network adaptor module 140 may reshape a neural network model so that various kinds of neural network models can be executed or, alternatively, optimally executed by dedicated hardware. For example, according to at least some example embodiments of the inventive concepts, the neural network adaptor module 140 may receive an input neural network model and generate a reshaped neural network model by reshaping the input neural network model such that the reshaped neural network model is tailored for execution by particular dedicated hardware.

Neural network operation may include various kinds of operations such as convolution using a weight. According to at least one example embodiment of the inventive concepts, a reshaped neural network model may have model content (e.g., a weight value) that is the same as or similar to an input neural network model, and therefore, the result of an operation using the input neural network model may be substantially the same as or similar to the result of an operation using the reshaped neural network model. The reshaped neural network model may be differentiated from the input neural network model by a way of applying the content or by an operation method using the content.

According to one or more example embodiments described above, dedicated hardware performing neural network operations may be tailored or, alternatively, optimized for various kinds of neural network models. For example, various kinds of applications may be executed in the electronic system 100 and various kinds of neural network models may be used for executing each application. At this time, a reshaped neural network model tailored or, alternatively, optimized for dedicated hardware may be generated using the neural network adaptor module 140 with respect to the various kinds of neural network models, and therefore, a neural network can be executed with improved performance and reduced or, alternatively, minimized power consumption through the dedicated hardware. In addition, different kinds of neural network models may be used for different kinds of applications. At this time, a neural network can also be executed with improved performance and reduced or, alternatively, minimized power consumption through the dedicated hardware.

The neural network adaptor module 140 may be implemented in various forms. The neural network adaptor module 140 may be implemented by hardware or software. When the neural network adaptor module 140 is implemented by hardware, the neural network adaptor module 140 may receive an input signal corresponding to at least one item of information parsed from an input neural network model and change the input signal using hardware including at least one circuit, thereby generating a reshaped neural network model. Alternatively, the neural network adaptor module 140 may be implemented in software in an operating system (OS) or a lower level. For example, according to at least some example embodiments of the inventive concepts, a memory (e.g., the RAM 120) may store computer-executable instructions corresponding to any or all operations described in the present disclosure as being performed by a neural network adaptor module (e.g., neural network adaptor modules 140, 200, 300, 532, neural network module 422, and/or adaptor module 423). Thus, a processor (e.g., processor 110, application processor (AP) 400, processor 410, and/or CPU 540) may implement the neural network adaptor module by executing the computer-executable instructions corresponding to any or all operations described in the present disclosure as being performed by a neural network adaptor module. In the present disclosure, a processor executing computer-executable instructions configured to cause the processor to perform and/or control any or all operations of a neural network adaptor module may also be referred to as the processor executing the neural network adaptor module.

Meanwhile, when the electronic system 100 is an AP, a system employing the electronic system 100 may include additional dedicated hardware which executes a neural network model. At this time, a reshaped neural network model generated in the electronic system 100 may be executed by dedicated hardware inside the electronic system 100 or by dedicated hardware provided outside the electronic system 100.

In descriptions of modifications of a neural network model below, an element referred to as hardware may be a concept including both general hardware and dedicated hardware. According to at least some example embodiments of the inventive concepts, hardware executing a reshaped neural network model may be dedicated hardware. Dedicated hardware refers to hardware specifically designed to perform particular functions or accomplish a particular task. Examples of dedicated hardware include, but are not limited to, application-specific integrated circuits (ASICs) and field-programmable gate arrays).

Figure 2:
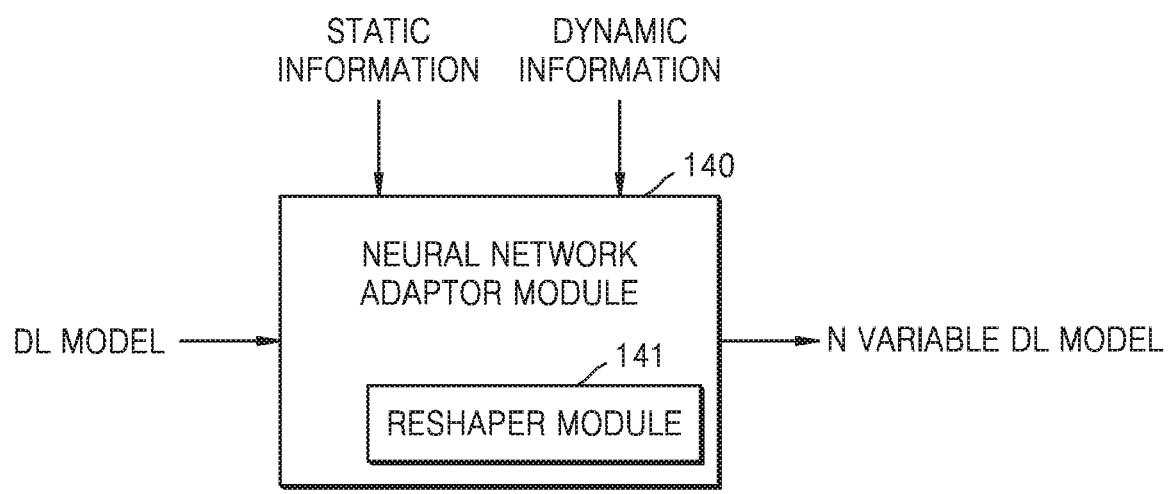
FIG. 2 is a block diagram for illustrating an example operation of the neural network adaptor module, according to at least one example embodiment of the inventive concepts.

FIG. 2 is a block diagram for illustrating an example operation of the neural network adaptor module 140, according to at least one example embodiment of the inventive concepts.

Referring to FIGS. 1 and 2, the neural network adaptor module 140 may receive an input neural network model, i.e., an input deep learning (DL) model, and generate a reshaped neural network model through reshaping. FIG. 2 shows an example in which N neural network models, i.e., N variable DL models, are generated with respect to the input DL model.

The neural network adaptor module 140 may include a reshaper module (or a reshaper) 141. The reshaper module 141 may perform reshaping using the input DL model and various kinds of information and generate a reshaped neural network model based on the reshaping result. For example, the neural network adaptor module 140 may receive at least one kind of information among static information and dynamic information and the reshaper module 141 may reshape the input DL model using the at least one kind of information from among the static information and the dynamic information. In other words, the input DL model may be reshaped taking account of hardware capacity, a desired or, alternatively, optimal operation method, etc.

The static information and the dynamic information may include various items of information. For example, the static information may include basic information of each of various elements of the electronic system 100, e.g., computing resource information such as the performance and characteristic of hardware executing a neural network model (or a neural network algorithm). The dynamic information may include various items of information which may be generated during execution of a neural network model, e.g., computing context information during runtime.

Reshaping a neural network model using the static information may be performed in offline mode. Reshaping in offline mode may be reshaping performed before a neural network model is actually executed. For example, before the electronic system 100 starts to operate or before a neural network operation is performed, the neural network adaptor module 140 may receive at least one input neural network model, generate a reshaped neural network model based on the static information, and store the reshaped neural network model in the electronic system 100.

Alternatively, reshaping a neural network model may be performed in online mode. At this time, the neural network model may be reshaped in real time using the dynamic information dynamically generated during runtime. For example, as an application is run in the electronic system 100, at least one neural network model may be executed and a reshaped neural network model for changing a method of processing the neural network model may be generated based on the dynamic information generated during the execution of the neural network model.

Figure 3:
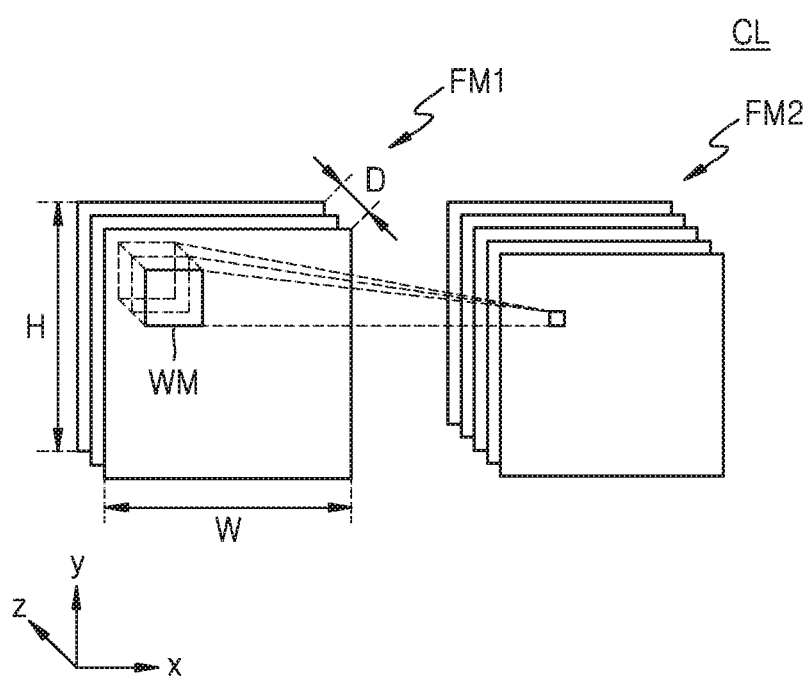
FIG. 3 is a diagram for illustrating an example of a convolutional neural network model.

FIG. 3 shows a CNN model as an example of a model of a neural network applicable to one or more example embodiments of the inventive concepts. Although only a convolution layer CL among various layers of the CNN model is illustrated in FIG. 3, the CNN model may also include a pooling layer and a fully connected layer.

In the convolution layer CL, a first feature map FM1 may be an input feature map and a second feature map FM2 may be an output feature map. Each feature map FM1 or FM2 is data which represents various features of input data. The first and second feature maps FM1 and FM2 may have a form of a two-dimensional matrix or a form of a three-dimensional matrix. These first and second feature maps FM1 and FM2 having a multi-dimensional matrix form may be referred to as feature tensors and the input feature map may be referred to as an activation. The first and second feature maps FM1 and FM2 have a width (or a column) W, a height (or a row) H, and a depth D, which may respectively correspond to the x-axis, the y-axis, and the z-axis in a coordinate system. The depth D may be referred to as the number of channels.

In the convolution layer CL, a convolution of the first feature map FM1 and a weight map WM may be performed and the second feature map FM2 may be generated as the convolution result. The weight map WM may filter the first feature map FM1 and may be referred to as a filter or a kernel. The depth, i.e., the number of channels of the weight map WM, may be the same as the depth, i.e., the number of channels of the first feature map FM1. The convolution may be performed on the same channels in both the weight map WM and the first feature map FM1. The weight map WM shifts by traversing the first feature map FM1 as a sliding window. The amount of shift may be referred to as a stride length or a stride. During a shift, each weight included in the weight map WM may be multiplied by and added to all feature values in an area where the weight map WM overlaps the first feature map FM1.

One channel of the second feature map FM2 may be generated by performing a convolution of the first feature map FM1 and the weight map WM. Although only one weight map WM is shown in FIG. 3, a plurality of weight maps may actually be convolved with the first feature map FM1 to generate a plurality of channels of the second feature map FM2. In other words, the number of channels of the second feature map FM2 may correspond to the number of weight maps.

The second feature map FM2 in the convolution layer CL may be an input feature map of a different layer. For example, the second feature map FM2 may be an input feature map of a pooling layer.

When an input neural network model is reshaped, the weight map WM may also be reshaped. For example, while convolution is performed based on the weight map WM having a size of N*N in an input neural network model, convolution may be performed based on the weight map WM having a changed size in a reshaped neural network model. The weight map WM having the size of N*N may be changed into at least one or two weight maps. For example, the size of the weight map WM may be changed into M*M, N*1, 1*N, M*1, 1*M, etc. As described above, content of the weight map WM before reshaping may be the same as or similar to that after the reshaping.

Figure 4:
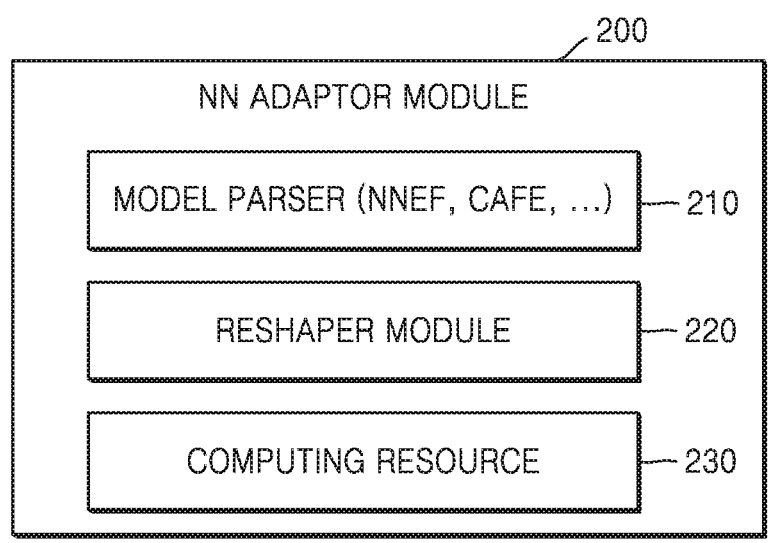
FIGS. 4 and 5 are diagrams of neural network adaptor modules according to at least one or more other example embodiments of the inventive concepts.
Figure 5:
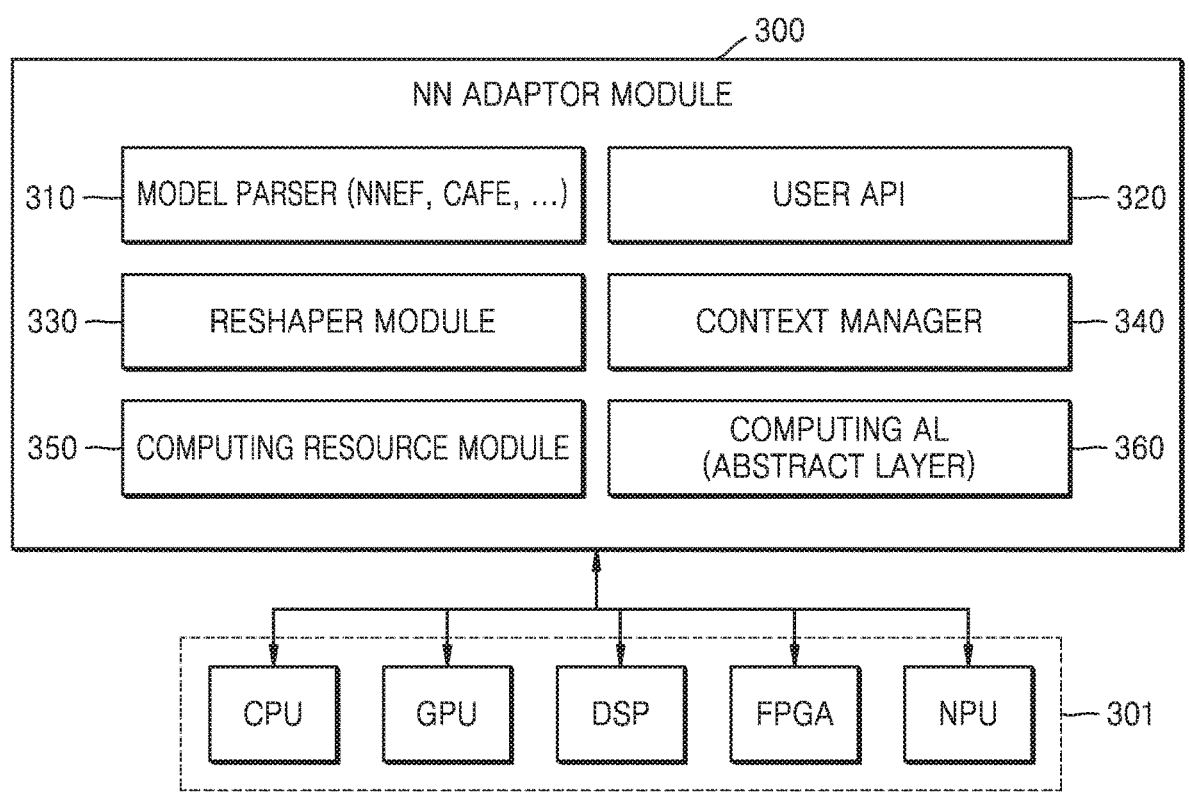

FIGS. 4 and 5 are diagrams of neural network adaptor modules 200 and 300 according to at least one or more other example embodiments of the inventive concepts. FIG. 4 shows an implementation for reshaping a neural network model in offline mode and FIG. 5 shows an implementation for reshaping a neural network model in online mode.

Referring to FIG. 4, the neural network adaptor module 200 may include a model parser 210, a reshaper module 220, and a computing resource module 230. The neural network adaptor module 200 may be an element included in a compiler. When the neural network adaptor module 200 generates a reshaped neural network model tailored or, alternatively, optimized for dedicated hardware (e.g., an NPU), the neural network adaptor module 200 may be an element included in an NPU compiler. The NPU compiler may compile commands to be suitable for an NPU. At this time, a reshaped neural network model tailored or, alternatively, optimized for the NPU may be generated by the neural network adaptor module 200.

The model parser 210 may parse various kinds of information from an input neural network model. The various kinds of information may include layer topology such as depth and branch; information related to a compression method; information related to an operation type at each layer; data property information such as format, security, and size; memory layout information for an operand such as input, kernel/filter, and output; and information about a data compression method. The kernel/filter may correspond to a weight and the memory layout information may include padding, stride, etc.

The computing resource module 230 may determine various kinds of information as the static information described above. For example, the computing resource module 230 may determine operation method information such as convolution/addition/maximum value, kernel structure information such as 3*3 or 5*5, data flow information, data reuse mode information, etc., as various kinds of information about hardware (e.g., dedicated hardware) for better acceleration. In addition, the computing resource module 230 may also determine capacity-related information such as the performance and power consumption of hardware and hardware limitation information such as unsupported data type or data layout, compression, quantization algorithm, etc., as other information about the hardware.

The reshaper module 220 may generate a reshaped neural network model based on the above-described information. The reshaper module 220 may determine a characteristic (e.g., an operating characteristic) of an input neural network model based on information from the model parser 210 and may generate a reshaped neural network model based on information from the computing resource module 230, according to a method of changing at least one item of the information parsed by the model parser 210. The reshaper module 220 may change at least one item of information of an input neural network model so that hardware executes the neural network model with better acceleration. For example, when hardware performs desired or, alternatively, optimal operation processing by using a kernel having a particular size, the reshaper module 220 may generate a reshaped neural network model by changing a kernel structure parsed by the model parser 210.

Referring to FIG. 5, the neural network adaptor module 300 may include a model parser 310, a user application programming interface (API) 320, a reshaper module 330, a context manager 340, a computing resource module 350, and a computing abstract layer (AL) 360. A hardware block 301 including various kinds of hardware devices executing various kinds of neural network models is also illustrated in FIG. 5. The hardware block 301 may include various kinds of hardware devices such as CPU, GPU, digital signal processor (DSP), field programmable gate array (FPGA), and NPU. Some hardware devices in the hardware block 301 may be general hardware and other hardware devices may be dedicated hardware tailored or, alternatively, optimized for a particular neural network model.

The neural network adaptor module 300 may be implemented in various forms. For example, various kinds of hardware such as NPU and GPU in an electronic system may access a neural network framework through a device driver to run software, and the neural network adaptor module 300 may be an element included in the neural network framework. The neural network adaptor module 300 may also provide a reshaped neural network model to at least one hardware device through the device driver and/or firmware.

Like or similarly to the model parser 210 described above, the model parser 310 may parse various kinds of information from an input neural network model. For example, as the neural network adaptor module 300 operates in online mode, the model parser 310 may parse various kinds of information from a neural network model currently being executed.

The user API 320 may manage selection information from a user in relation to generation of a reshaped neural network model. The user API 320 may provide a user of an electronic system with a user interface for inputting selection information related to reshaping of a neural network model and the user can input various kinds of selection information through the user interface. For example, when a user runs an application including a neural network operation, a user interface may be provided for the user based on the control of the user API 320.

Various kinds of information related to a neural network operation may be provided to the neural network adaptor module 300 through the user API 320. For example, the kind (e.g., CNN or RNN) of a neural network model to be executed when an application is run may be input as selection information. In addition, various kinds of user preference information such as information regarding kernel size, information regarding neural network processing speed and power consumption, and data size information may be input as the selection information.

Methods of setting hardware executing a neural network according to the selection information input through the user API 320 may be classified into two categories, i.e., explicit hardware fitting and implicit hardware fitting. In the explicit hardware fitting, a hardware device to execute a neural network model among a plurality of hardware devices included in an electronic system and the processing speed and power consumption of the hardware device may be set according to the selection information provided by a user. On the contrary, in the implicit hardware fitting, various kinds of preference information regarding a neural network operation may be provided by a user, but setting of a hardware device to execute a neural network model may be arbitrarily performed in the electronic system regardless of the user's selection. In the implicit hardware fitting, hardware to execute a neural network model and the processing speed and power consumption of the hardware may be set by an OS.

The context manager 340 may manage dynamic information during execution of a neural network model, as described above, and may provide the dynamic information to the reshaper module 330. Various kinds of status or information regarding the execution of the neural network model may be managed by the context manager 340 during runtime. For example, output accuracy, information regarding latency and frame per second (FPS), or information regarding an accuracy loss tolerance during execution of an application may be provided to the reshaper module 330 through the context manager 340. Together with such runtime-related dynamic information, resource-related dynamic information such as a change in computing resource status, power/temperature information, bus/memory/storage status, a kind of the application, and a lifecycle of the application, etc. may also be provided to the reshaper module 330 through the context manager 340. The computing resource module 350 may manage static information, as described above with reference to FIG. 4, and may provide the static information to the reshaper module 330. In other words, the static information provided by the computing resource module 350 may also be used when a neural network model is reshaped in online mode.

The computing AL 360 may manage computing resources. The reshaper module 330 may change an input neural network model based on information provided from various elements included in the neural network adaptor module 300.

An input neural network model and a reshaped neural network model may be provided to each hardware device of the hardware block 301. For example, when the input neural network model is executed by general hardware, the input neural network model may be executed by the general hardware without being changed. When hardware executing the input neural network model is changed to dedicated hardware such as an FPGA or an NPU during runtime, the reshaped neural network model generated by the neural network adaptor module 300 may be executed by the dedicated hardware.

As described above, the neural network adaptor modules 200 and 300 respectively shown in FIGS. 4 and 5 may generate a reshaped neural network model in both online mode and offline mode and the reshaping may be modeled as a function. For example, the reshaping may be defined as an operation in which an input neural network model, a kind of hardware, static/dynamic information of the hardware, and selection information from the user API 320 are received as the inputs of a function inputs and a reshaped neural network model is generated as the result of the function.

Meanwhile, as described above, a kernel structure as a modification of a neural network model may be changed. The changing of the kernel structure may include changing a method regarding an operation using a kernel. For example, either or both of the size and data type of the kernel may be changed. Data types used in a kernel operation may be classified into various categories. For example, data types (e.g., integer, unsigned integer, floating point, etc.), such as int4, int8, int16, int32, uint4, uint8, uint16, uint32, float16, and float32, or the number of bits in data, may be changed. Here, int4 represent a 4-bit integer, uint8 represents an 8-bit unsigned integer, and float32 represents a 32-bit floating point.

When the neural network model is reshaped based on the static information, the dynamic information, and the user API information so that memory consumption or power consumption is reduced, the kernel size may be decreased or the data type may be changed into one on the left in the above-described line of data types. However, when the neural network model is reshaped so that accuracy is increased, the kernel size may be increased or the data type may be changed into one on the right in the above-described line of data types.

Figure 6A:
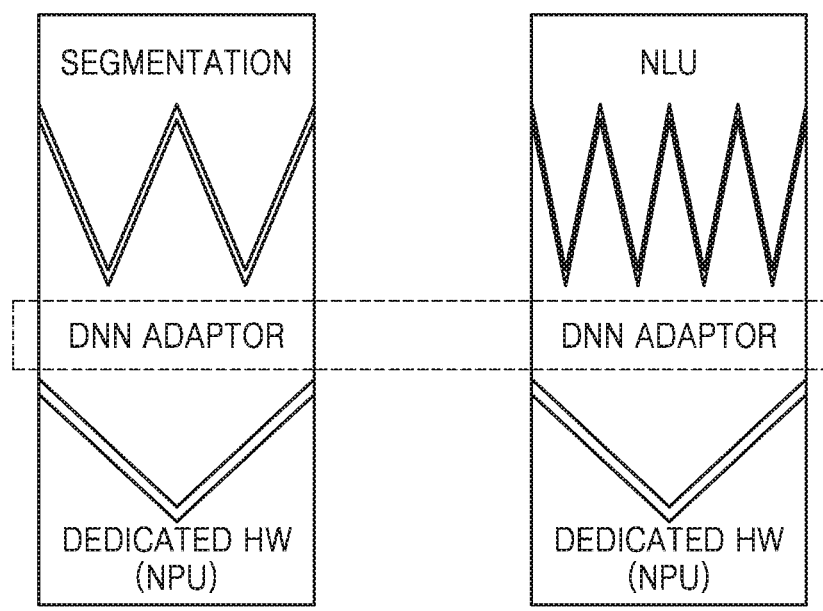
FIGS. 6A through 6C are conceptual block diagrams of the operation of a neural network adaptor module, according to at least one example embodiment of the inventive concepts.
Figure 6B:
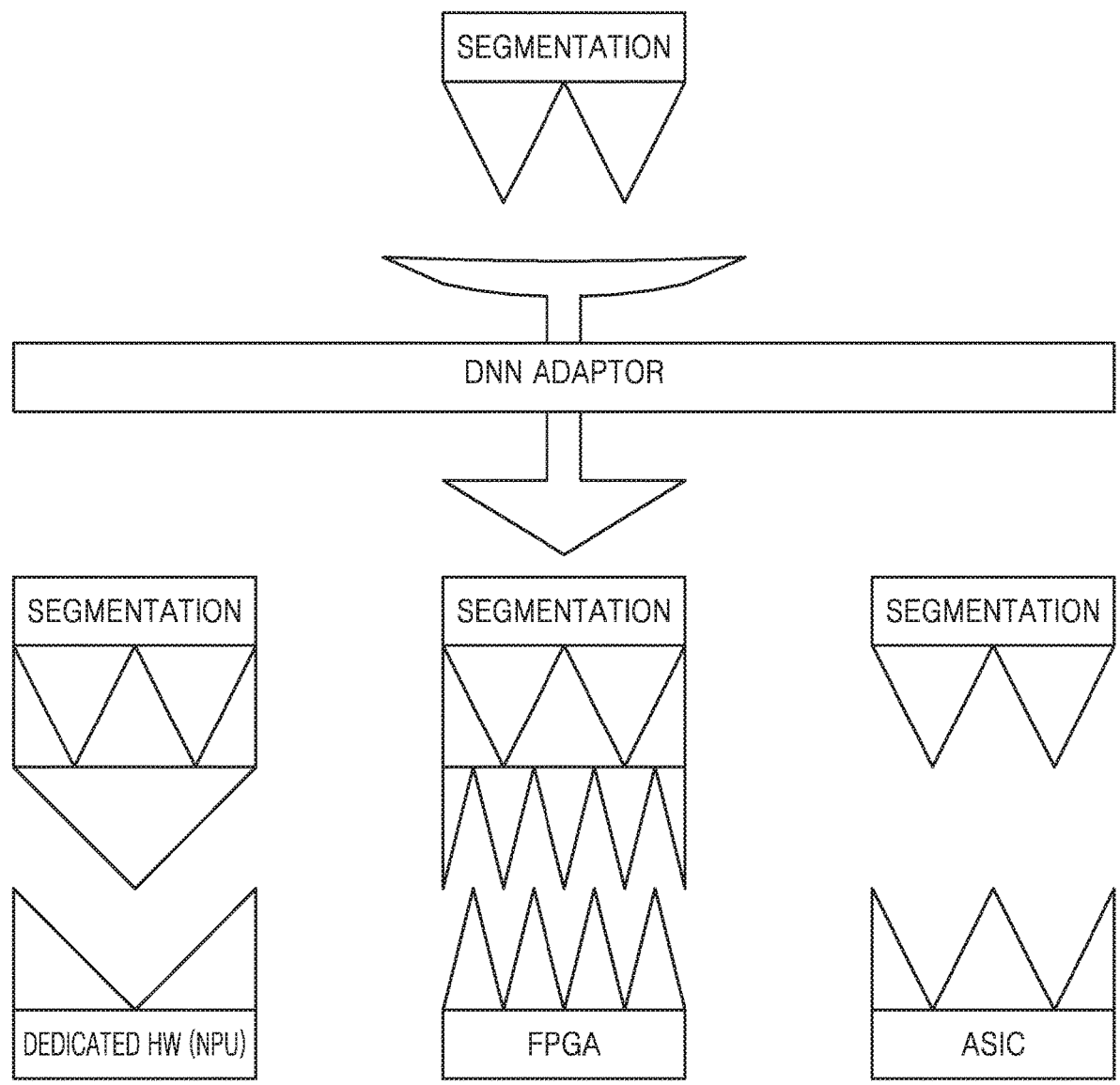
Figure 6C:
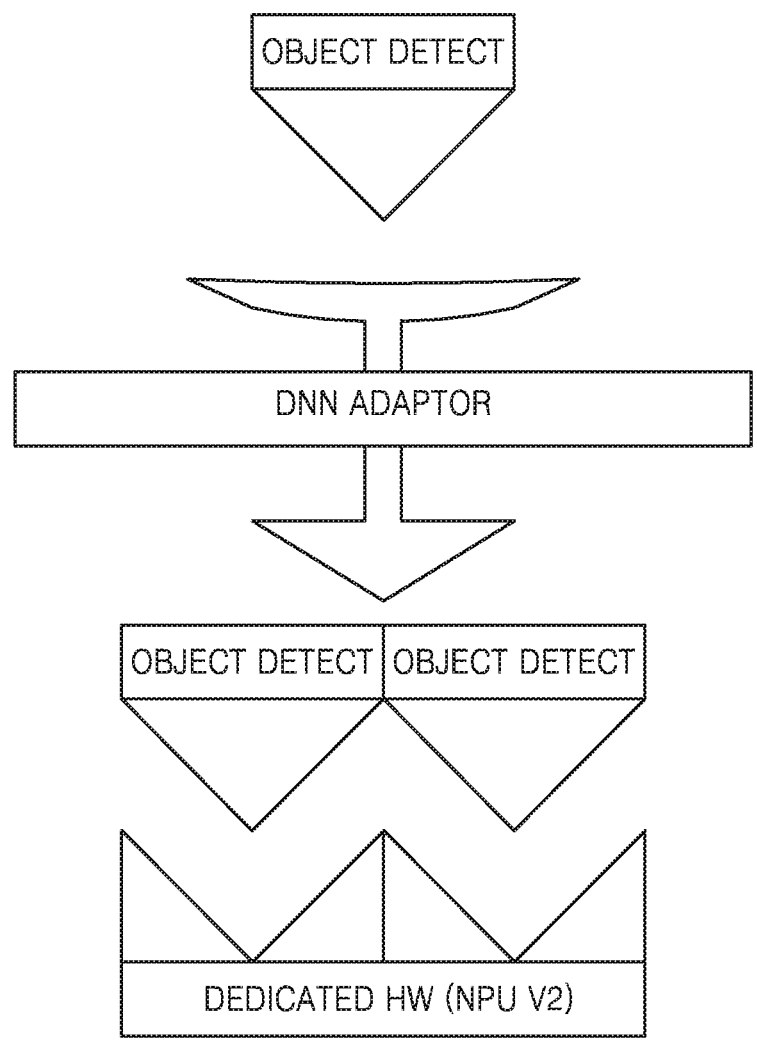

FIGS. 6A through 6C are conceptual block diagrams of the operation of a neural network adaptor module, according to at least one example embodiment of the inventive concepts. In FIGS. 6A through 6C, an input neural network model and a reshaped neural network model are deep neural networks (DNNs).

Referring to FIG. 6A, a neural network adaptor module, i.e., a DNN adaptor, may generate a reshaped neural network model tailored or, alternatively, optimized for dedicated hardware (HW), i.e., an NPU. The DNN adaptor may receive various kinds of input neural network models (e.g., segmentation, natural language understanding (NLU), etc.) and may generate a reshaped neural network model tailored or, alternatively, optimized for the NPU through reshaping. Segmentation may be a neural network model for image recognition and the NLU may be a neural network model for speech recognition.

Referring to FIG. 6B, a neural network adaptor module, i.e., a DNN adaptor, may generate reshaped neural network models respectively tailored or, alternatively, optimized for various kinds of dedicated HW, i.e., an NPU, an FPGA, an ASIC. When a particular input neural network model (e.g., segmentation) is provided to the DNN adaptor, the DNN adaptor may adaptively perform model reshaping according to a kind of dedicated HW which performs actual neural network processing. For example, the DNN adaptor may generate a reshaped neural network model tailored or, alternatively, optimized for the NPU, the FPGA, or the ASIC by reshaping the particular input neural network model (e.g., segmentation).

FIG. 6C shows the operation in a case where dedicated HW, i.e., an NPU, executing a neural network model is high-performance HW which can perform at least twice computation. An input neural network model may include information tailored or, alternatively, optimized for the NPU, and therefore, a change in an operation method, e.g., a kernel size, may not be used during model reshaping. A neural network adaptor module, i.e., a DNN adaptor, may generate a reshaped neural network model taking account of the performance of the NPU so that at least two neural network models are executed. For example, the DNN adaptor may generate a reshaped neural network model by changing the number of instances.

In FIGS. 6A through 6C, neural network models are geometricized and the shape of figures may be determined by various kinds of information. For example, a kernel size, a weight, or the number of bits may be the information determining the shape of the figures.

FIGS. 7 through 10 are flowcharts of a method of operating a neural network adaptor module, according to at least one example embodiment of the inventive concepts.

Referring to FIG. 7, the neural network adaptor module may reshape a neural network model based on static information regarding HW in offline mode before the neural network model is actually executed. Time before the execution of the neural network model may refer to various periods. For example, a neural network model may be reshaped using the original neural network model and information regarding HW during application development or a neural network model may be reshaped based on static information during booting of an electronic system or before the neural network model is executed after the booting.

Various kinds of information may be parsed from an original neural network model in operation S11. Computing resource information as static information may be analyzed in operation S12. It may be determined whether there is any neural network model not supported or not accelerated by HW (e.g., computing HW) among various original neural network models in operation S13. When it is determined that there is not any neural network model supported by the computing HW, the neural network model may be reshaped to generate a reshaped neural network model suitable for the computing HW in operation S14.

It may be determined whether there is any characteristic further customized for or further harmonizing with the computing HW among characteristics of a neural network model supported by the computing HW or the reshaped neural network model in operation S15. When it is determined that there is no characteristic further customized for or further harmonizing with the computing HW, the neural network model may be determined as a neural network model to be executed by the computing HW. However, when it is determined that there is any characteristic further customized for or further harmonizing with the computing HW, a reshaped neural network model may be generated by changing some of the characteristics of the original neural network model, that is, reshaped characteristics may be linked to the computing HW in operation S16.

Figure 8:
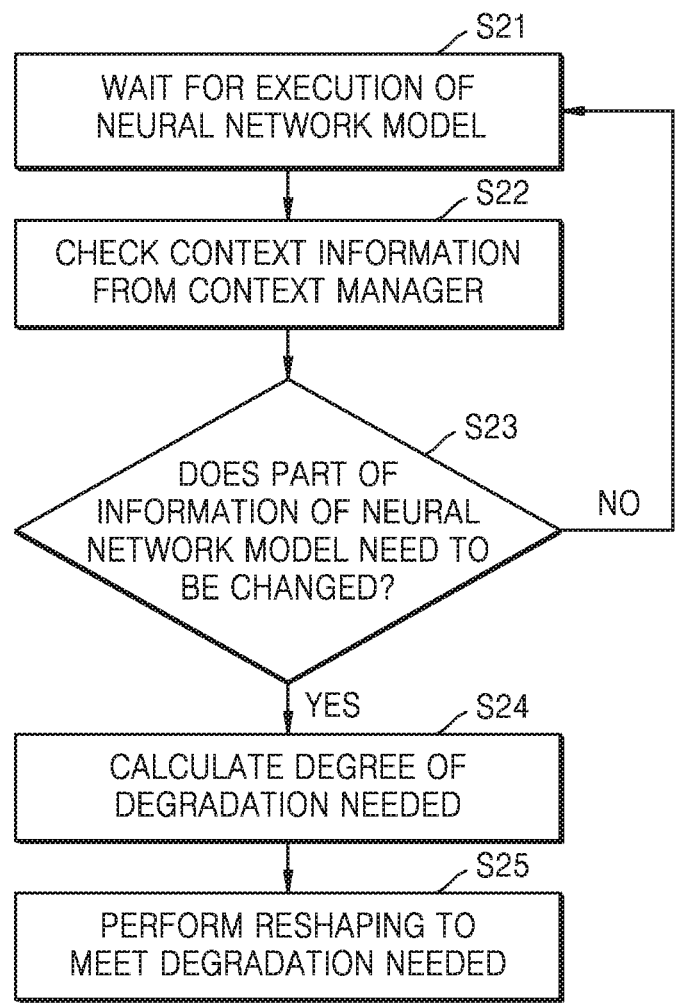

FIG. 8 shows an example of reshaping a neural network model in online mode. Referring to FIG. 8, execution of a neural network model may be waited for in operation S21. The neural network model waiting for execution may be the original neural network model or the reshaped neural network model generated in offline mode in the example shown in FIG. 7. When the execution of the neural network model begins, context information from a context manager may be checked by the neural network adaptor module during runtime in operation S22. Whether part of information of the neural network model currently being executed needs to be changed may be determined based on the checked context information in operation S23.

The information of the neural network model may be changed variously. FIG. 8 shows an example of degrading performance (e.g., accuracy) of a neural network. A degree of degradation of the performance may be calculated taking account of accuracy tolerance for a currently running application in operation S24. Reshaping to meet the degree of degradation needed may be performed according to the calculation result in operation S25.

Figure 9:
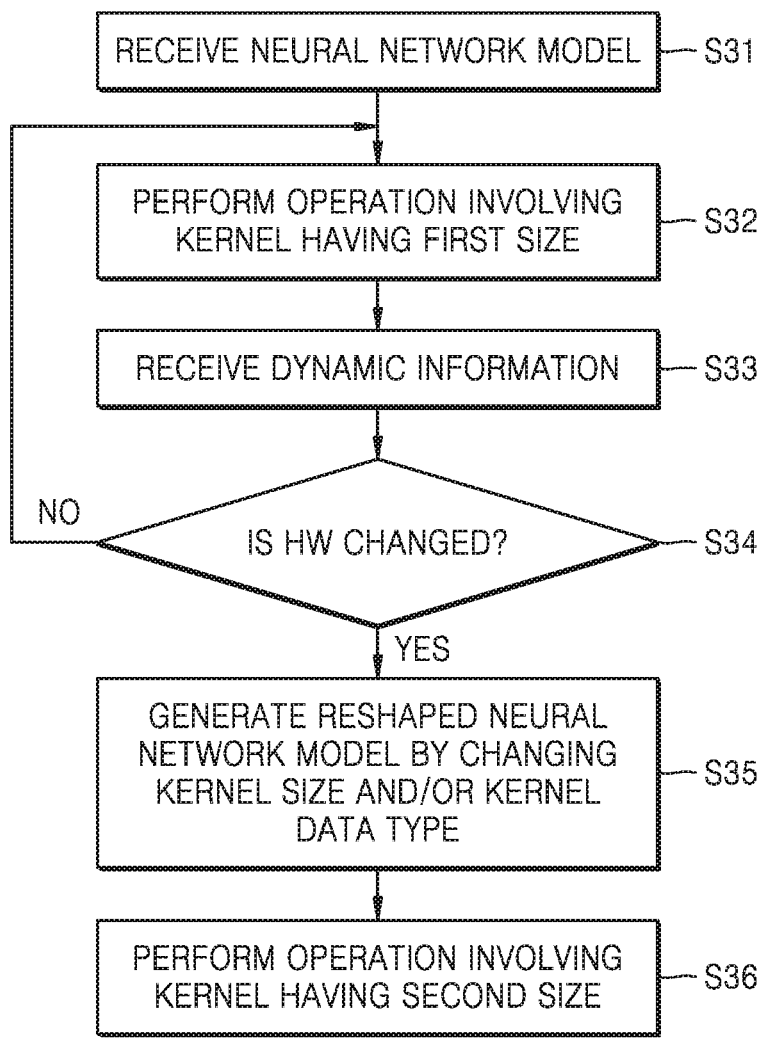

FIG. 9 shows an example of changing a kernel size using a reshaped neural network model during runtime.

Referring to FIG. 9, a neural network model is received by HW which will execute a neural network operation in operation S31. The HW may perform an operation involving a kernel having a first size according to the neural network model in operation S32. The neural network adaptor module may receive dynamic information during runtime in operation S33 and may determine whether the HW executing the neural network model is changed in operation S34.

When it is determined that the HW is not changed, the HW currently executing the neural network model may perform the operation. However, when it is determined that the HW currently executing the neural network model is changed to dedicated HW, the neural network adaptor module may generate a reshaped neural network model by changing the kernel size and/or kernel data type based on the neural network model and the dynamic information in operation S35. For example, the kernel size may be changed from the first size to a second size. The dedicated HW may perform an operation involving a kernel having the second size in operation S36.

Figure 10:
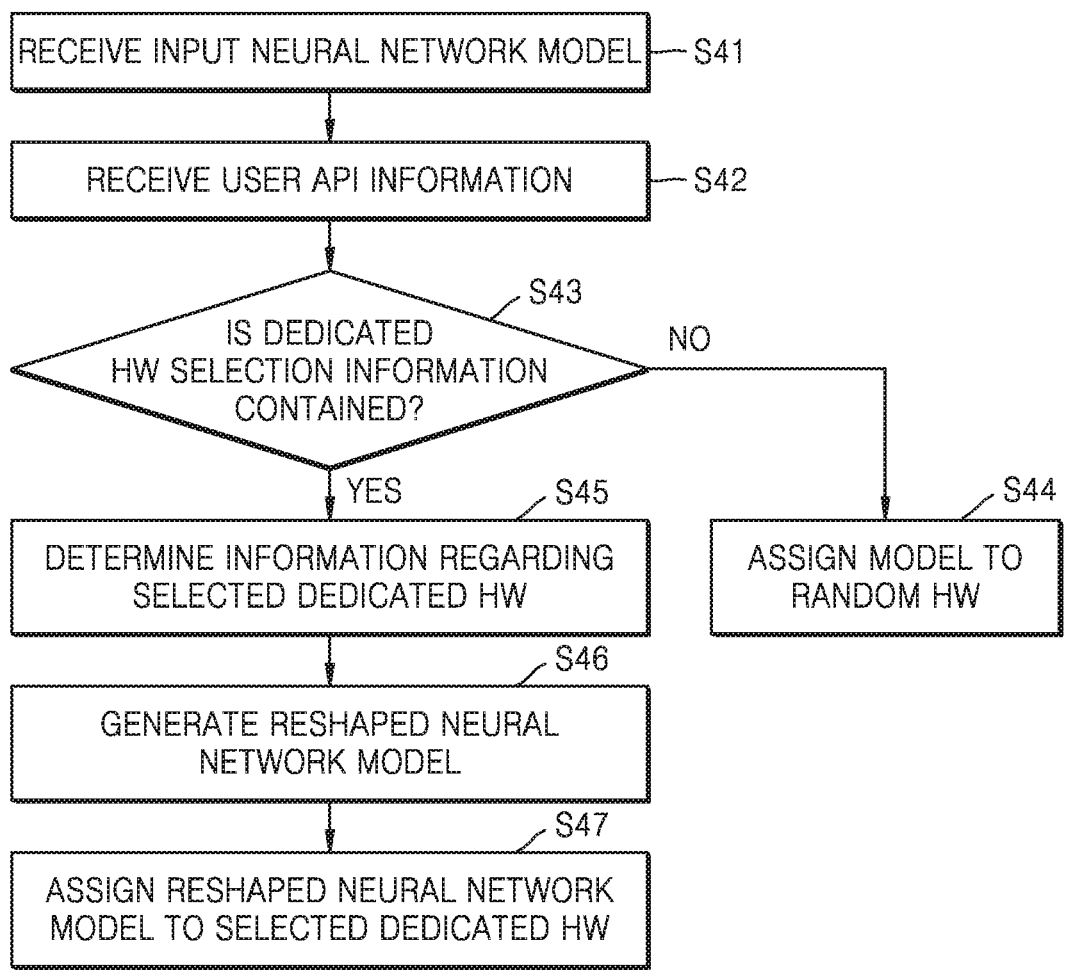

FIG. 10 shows an example of the operation using HW selection information received through a user interface.

Referring to FIG. 10, the neural network adaptor module may receive an input neural network model in operation S41 and may also receive user API information through the user interface in operation S42. The neural network adaptor module may determine whether the user API information contains dedicated HW selection information in operation S43.

When it is determined that the user API information does not contain the dedicated HW selection information, the input neural network model may be assigned to random HW based on the control of the neural network adaptor module in operation S44. When the input neural network model is assigned to general HW such as a CPU, the input neural network model may be assigned to the general HW without the reshaping described above. When the input neural network model is assigned to dedicated HW, e.g., an NPU, a reshaped neural network model may be generated, as described above, and the reshaped neural network model may be assigned to the dedicated HW.

When it is determined that the user API information contains the dedicated HW selection information, information regarding dedicated HW selected by a user may be determined based on the control of the neural network adaptor module in operation S45. The neural network adaptor module may generate a reshaped neural network model using static and/or dynamic information regarding the selected dedicated HW in operation S46. The reshaped neural network model may be assigned to the selected dedicated HW in operation S47.

Hereinafter, examples of generating reshaped neural network models by changing various kinds of information parsed from an input neural network model will be described.

Figure 11:
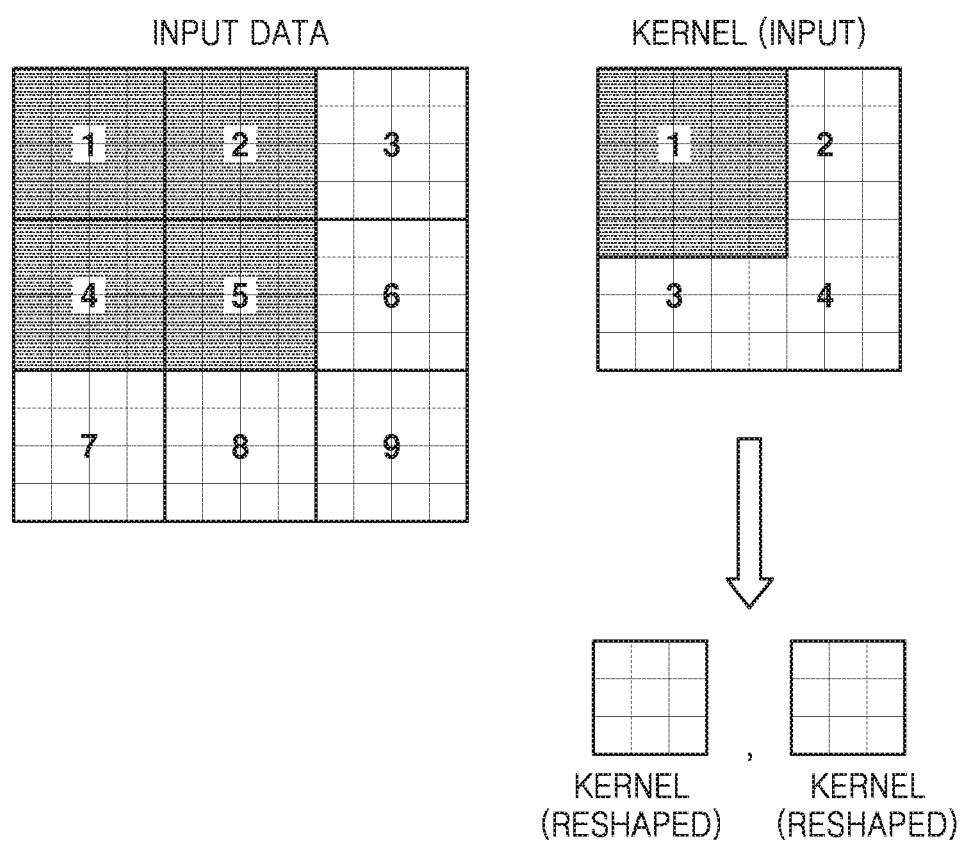
FIG. 11 is a block diagram of for illustrating an example of generating a reshaped neural network model by controlling a kernel size.

FIG. 11 is a block diagram for illustrating an example of generating a reshaped neural network model by controlling a kernel size.

An NPU, as a dedicated processor, may operate at improved or, alternatively, optimal performance in a kernel structure having a particular size. For example, when N has a particular value in an N*N kernel structure, the NPU may operate at improved or, alternatively, optimal performance. In detail, when N is a multiple of 4 or a value a little less than a multiple of 4 in the N*N kernel structure, the NPU may operate at improved or, alternatively, optimal performance. However, when an input neural network model performs an operation involving a kernel having a size of 5*5 and is executed by the NPU, the performance may be degraded.

A neural network adaptor module according to at least one example embodiment of the inventive concepts may parse information regarding the N*N kernel structure from the input neural network model and may determine kernel size information tailored or, alternatively, optimized for the NPU based on static and/or dynamic information regarding the NPU. For example, the neural network adaptor module may approximate the 5*5 kernel to two 3*3 kernels in the input neural network model, thereby generating a reshaped neural network model having two 3*3 kernels resulting from the changing of the 5*5 kernel. The reshaped neural network model may be executed by the NPU. According to at least some example embodiments of the inventive concepts, a calculation result of using the two 3*3 kernels may be identical, or, alternatively, similar, to a calculation result of using the 5*5 kernel. For example, according to at least some example embodiments of the inventive concepts, the two 3*3 kernels may be chosen in such a manner that a result (e.g., a classification result, a recognition result, etc.) of a neural network model performing a desired function (e.g., a classification function, a recognition function, etc.) while using the two 3*3 kernels is identical, or, alternatively, similar, to a result of the neural network model performing the same function while using the 5*5 kernel. Thus, even in a scenario where the input neural network model is modified (e.g., reshaped) in the middle of execution, a desired function of the input neural network model may be maintained by the reshaped neural network model, and the neural network model may be executed in an improved or, alternatively, optimal manner by the specific hardware for which the reshaped neural network has been tailored or, alternatively, optimized.

Figure 12:
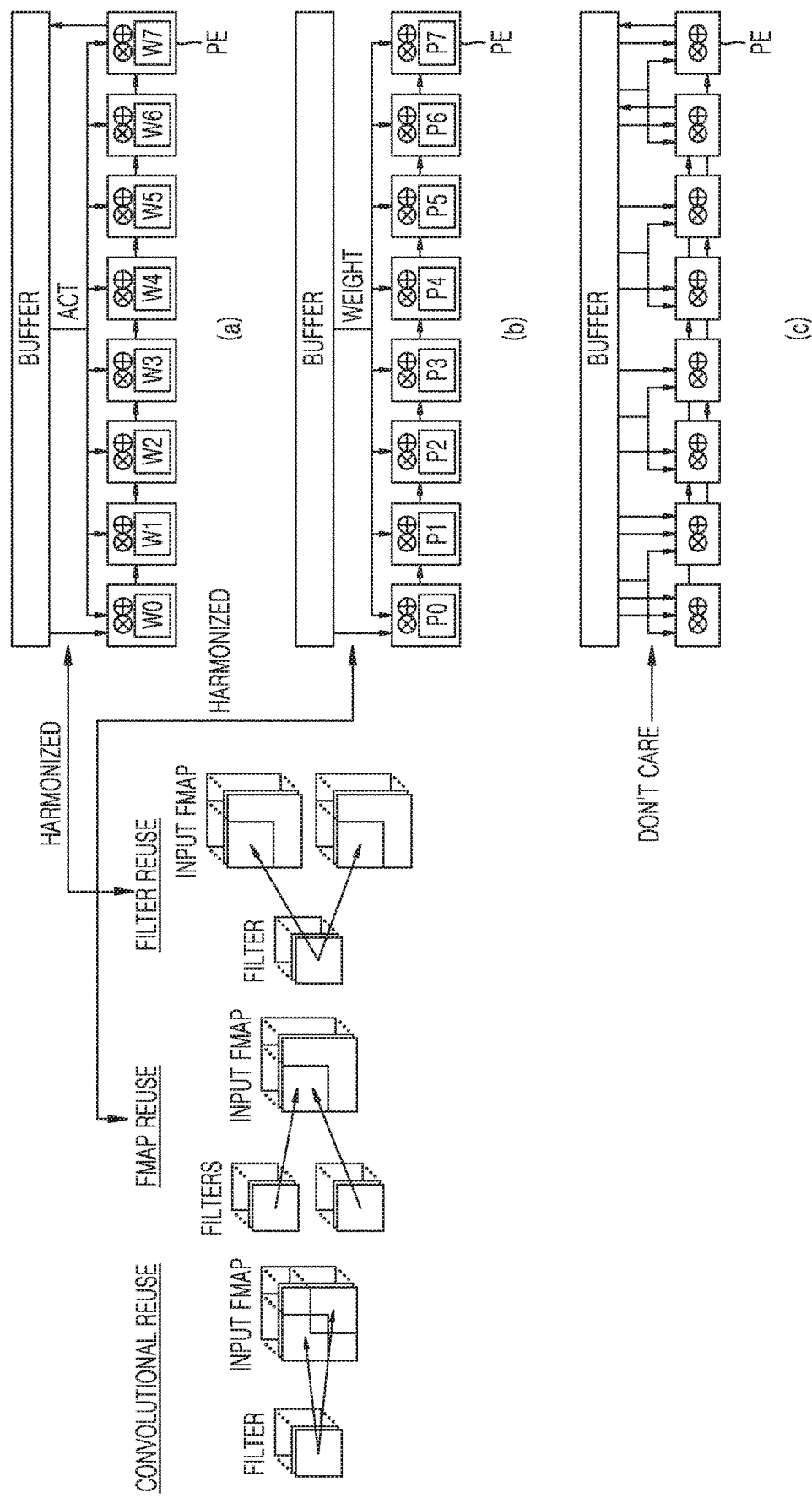
FIG. 12 is a block diagram for illustrating an example of generating a reshaped neural network model by changing a reuse mode.

FIG. 12 is a block diagram for illustrating an example of generating a reshaped neural network model by changing a reuse mode.

Referring to FIG. 12, a processor executing a neural network model may include a plurality of processing elements PE and dataflow of the processor may be classified into various types according to the operating characteristics of the processing elements PE. For example, HW such as an NPU may have weight stationary dataflow; HW such as a GPU may have output stationary dataflow; and some other HW may have dataflow not using reuse.

For example, in FIG. 12, items (a), (b) and (c) denote three types of HW, respectively: HW (a), HW (b) and HW (c). FIG. 12 also illustrates weights W0-W7 and partial sums P0-P7. As is illustrated in FIG. 12, HW (a) and HW (b) may each be harmonized. "Harmonized" denotes that each type of HW may be tailored or, alternatively, optimized for a particular type of data reuse method. For example, HW (a) may be optimized for a filter reuse method, and HW (b) may be optimized for a feature map (FMAP) reuse method. Further, some HW types may not be harmonized and may not use data reuse, as is illustrated in FIG. 12 with respect to HW (c).

In the example illustrated in FIG. 12, HW (a) has a data flow of a weight stationary type (WST) and HW (b) has a dataflow of an output stationary type (OST).

With respect to the WST data flow, each weight (e.g., each of weights W0-W7) may be read from a DRAM into each PE such that the weight stays stationary for further accesses. Further, processing according to the WST data flow may include running one or more MACs that use the same weight or, alternatively, as many MACs that use the same weight as possible. According to at least some example embodiments of the inventive concepts, the inputs and partial sums move through a spatial array and global buffer, input FMAP activations are broadcast to all PEs, and the partial sums are spatially accumulated across the PE array. For example, as is illustrated in FIG. 12, HW (a) may use an activation signal ACT which indicates that an input FMAP is activated.

With respect to the OST data flow, according to at least some example embodiments of the inventive concepts, the OST data flow is designed to reduce or, alternatively, minimize the energy consumption of reading and writing the partial sums (e.g., partial sums P0-P7). For the OST data flow, the accumulation of partial sums may be kept for the same output activation value. Further, according to at least one example embodiment of the inventive concepts, input activations may be streamed across the PE array, and the corresponding weight is broadcast to all PEs in the array (e.g., using a weight signal WEIGHT, as illustrated in FIG. 12).

A neural network adaptor module according to at least one example embodiment of the inventive concepts may parse information regarding data reuse from an input neural network model. The information regarding data reuse may be about convolutional reuse, feature map reuse, filter reuse, etc. At this time, taking account of the operation method characteristic of HW, weight stationary type HW may be tailored or, alternatively, optimized for filter reuse mode and output stationary type HW may be tailored or, alternatively, optimized for feature map reuse mode. However, HW not using reuse may be set to "don't care" with respect to reuse mode for the neural network model.

A modified neural network adaptor module may receive information regarding a kind of HW executing an input neural network model as static or dynamic information and may change reuse information of the input neural network model taking account of a dataflow type of the HW. For example, the neural network adaptor module may generate a reshaped neural network model using the filter reuse mode with respect to a neural network model to be executed by weight stationary type HW. The neural network adaptor module may generate a reshaped neural network model using the feature map reuse mode with respect to a neural network model to be executed by output stationary type HW. When a neural network model is executed by HW not using reuse, the neural network adaptor module may apply random reuse mode to the neural network model.

Figure 13:
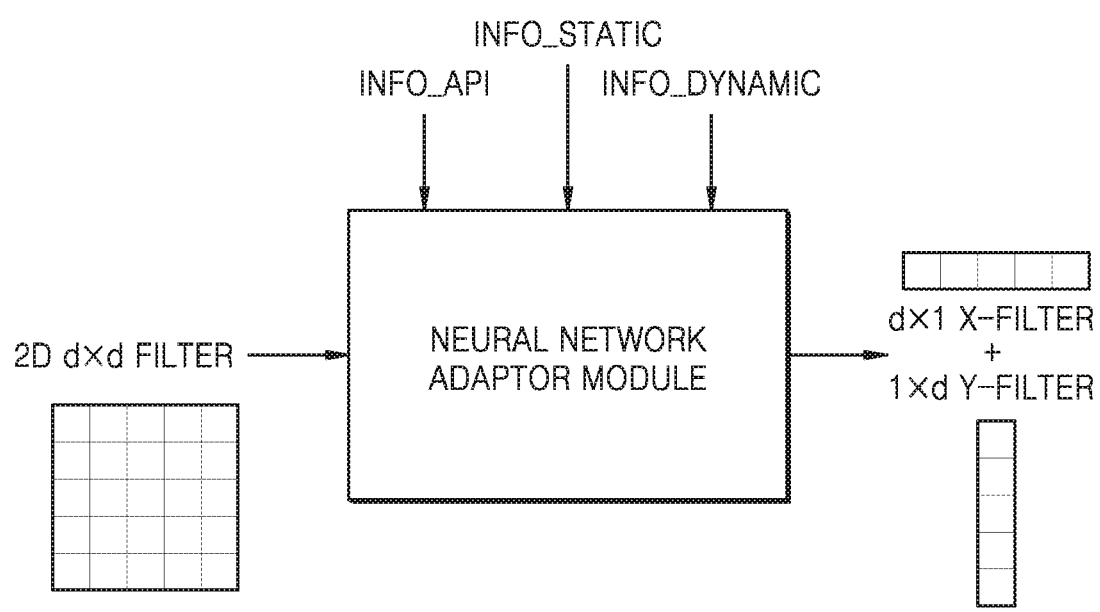
FIG. 13 is a block diagram for illustrating an example of generating a reshaped neural network model by controlling performance.

FIG. 13 is a block diagram for illustrating an example of generating a reshaped neural network model by controlling performance. Performance such as accuracy of a neural network model may be controlled according to a kind of an application executed. For example, when a neural network operation for image processing is performed, image processing performance needs to be increased for vehicle's autonomous driving. However, it is fine if the image processing performance is a little degraded within a tolerance limit when a simple camera application is executed in a smart phone or the like.

Referring to FIG. 13, a convolution operation using a two-dimensional (2D) d*d filter (or kernel) is applied to an input neural network model, but a reshaped neural network model having degraded performance may be generated based on at least one kind of information among user API information INFO_API, static information INFO_STATIC, and dynamic information INFO_DYNAMIC. Performance of a neural network model may be controlled based on various kinds of information. For example, a kind of an application requiring a neural network operation may be determined based on the dynamic information INFO_DYNAMIC and performance of a neural network model may be controlled according to the determined application.

Performance may be controlled by controlling the size of a filter. For example, a 2D d*d filter applied to an input neural network model may be approximated to at least one filter. FIG. 13 shows an example in which the 2D d*d filter is approximated to a d*1 X-filter and a 1*d Y-filter.

In the example illustrated in FIG. 13, performance of a neural network model may be controlled based on other various kinds of information than a kind of an application. For example, when a neural network model requires a frame rate of 30 fps and the neural network model is being executed at a frame rate of 60 fps during runtime, information regarding the frame rate during runtime may be provided as the dynamic information INFO_DYNAMIC. At this time, the frame rate may be decreased by controlling the kernel size of the neural network model. Contrarily, when the frame rate during runtime is lower than the required frame rate, the neural network model may be reshaped to increase the frame rate.

Figure 14B:
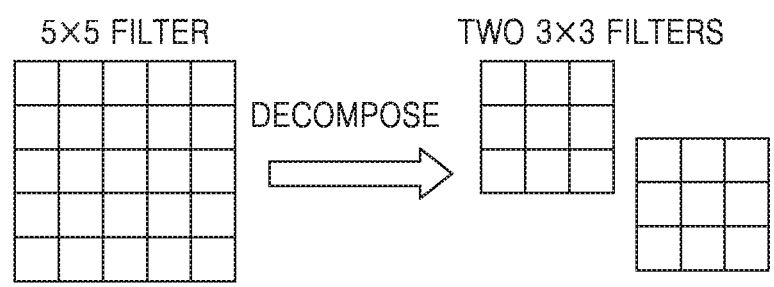
Figure 14C:
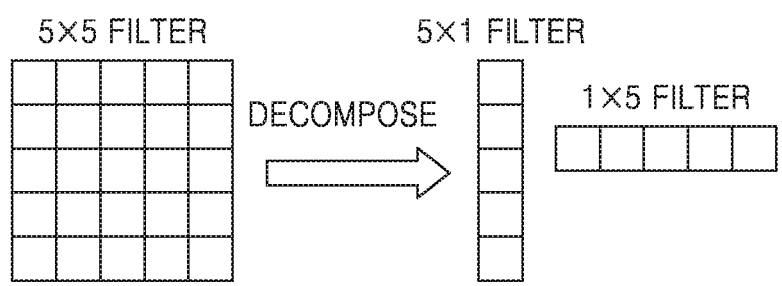

FIGS. 14A through 14C are diagrams for illustrating examples in which a neural network model is reshaped according to operating characteristics of HW.

Referring to FIG. 14A, HW may perform an operation in various types of architecture. For example, HW may include a plurality of arithmetic logic units (ALUs). In FIG. 14A, item (a) denotes an example structure of HW having a temporal architecture, and item (b) denotes an example structure of HW having a spatial architecture. When HW has temporal architecture, the ALUs may perform an operation in parallel. Contrarily, when HW has spatial architecture, the ALUs may perform an operation sequentially.

Different types of neural network models may be tailored or, alternatively, optimized for a processor according to the above-described architecture. For instance, an operation may be tailored or, alternatively, optimized for a processor in the temporal architecture by decreasing the number of multiplications. As shown in FIG. 14B, an input neural network model having a relative large kernel size (e.g., 5*5) may be reshaped into a neural network model having at least one small kernel size (e.g., 3*3), and the reshaped neural network model may be provided to a processor in the temporal architecture. Contrarily, an operation may be tailored or, alternatively, optimized for a processor in the spatial architecture by increasing data reuses. As shown in FIG. 14C, an input neural network model having a 2D kernel size (e.g., 5*5) may be reshaped into a neural network model having at least one one-dimensional (1D) kernel size (e.g., 1*5 and 5*1), and the reshaped neural network model may be provided to a processor in the spatial architecture.

In some modified example embodiments of the inventive concepts, even when processors have the same architecture, preference information regarding the size of a kernel executed by each processor may be different among the processors. For example, an FPGA, as dedicated HW in the temporal architecture, may perform an operation based on a fast Fourier transform (FFT) and may perform a desired or, alternatively, optimal operation with a kernel having a size of 5*5. Contrarily, an NPU, as dedicated HW in the temporal architecture, may perform an operation based on the Winograd algorithm and may perform a desired or, alternatively, optimal operation with a kernel having a size of 3*3. At this time, when an input neural network model includes a kernel having a size of 7*7 in the example shown in FIG. 14B and is executed by an FPGA as dedicated HW, the kernel having the size of 7*7 may be changed into two kernels having the size of 5*5. When the input neural network model is executed by an NPU as the dedicated HW, the kernel having the size of 7*7 may be changed into three kernels having the size of 3*3.

In at least some other modified example embodiments of the inventive concepts, execution of a neural network model may be tailored or, alternatively, optimized by assigning the neural network model to particular dedicated HW according to a kind of the neural network model based on the control of a neural network adaptor module. For example, when a neural network model corresponds to a CNN, The CNN may frequently reuse data but may not reuse a feature map or a kernel. At this time, the neural network model corresponding to the CNN may be assigned to dedicated HW in the spatial architecture. However, when the neural network model corresponds to an RNN/long short term memory (LSTM), the RNN/LSTM may not reuse or rarely reuses data. At this time, the neural network model corresponding to the RNN/LSTM may be executed or, alternatively, optimally executed by compression-accelerator embedded HW. For example, the neural network model corresponding to the RNN/LSTM may be assigned to dedicated HW in the temporal architecture.

Besides, assignment of dedicated HW may be controlled according to a type of a task performed by a neural network model. For example, a neural network model may include various kinds of layers such as a convolution layer and a fully-connected layer. The convolution layer may require a high-level operation and the fully-connected layer may require high-level memory access. In execution of the neural network model, the convolution layer may be assigned to dedicated HW in the spatial architecture, as HW on the level of a transition-based object-oriented programming system (TOPS). The fully-connected layer may be assigned to dedicated HW in the temporal architecture, as HW having a high memory capacity.

Figure 15:
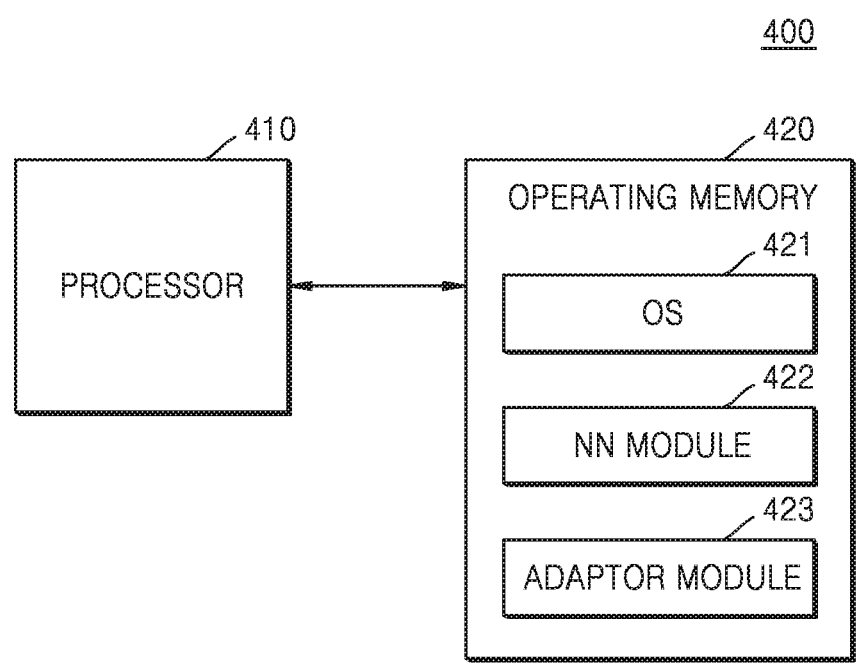
FIG. 15 is a block diagram for illustrating an example in which a neural network adaptor module is implemented by software, according to at least one example embodiment of the inventive concepts.

FIG. 15 is a block diagram for illustrating an example in which a neural network adaptor module is implemented by software, according to at least one example embodiment of the inventive concepts. A system illustrated in FIG. 15 may be an AP 400. The AP 400 may be implemented in a system-on-chip (SoC) as a semiconductor chip.

The AP 400 may include a processor 410 and an operating memory 420. Although not shown in FIG. 15, the AP 400 may also include at least one intellectual property (IP) module connected to a system bus. The operating memory 420 may store software, such as various programs and commands, involved in the operation of the system using the AP 400. The operating memory 420 may include an OS 421, a neural network (NN) module 422, and an adaptor module 423. The adaptor module 423 may perform the functions of a neural network adaptor module according to one or more example embodiments of the inventive concepts.

The NN module 422 may perform an operation of an original neural network model or a reshaped neural network model according to at least one example embodiment of the inventive concepts. The NN module 422 may also receive an input neural network model and perform model reshaping according to one or more example embodiments of the inventive concepts. The NN module 422 may be implemented in the OS 421 in other embodiments.

Although only one processor 410 is shown in FIG. 15, the AP 400 may include a plurality of processors. Some of the processors may be general processors and other processors may be dedicated processors for execution of a neural network model. The adaptor module 423 may perform model reshaping using static information and dynamic information regarding a dedicated processor and may generate a reshaped neural network model tailored or, alternatively, optimized for the dedicated processor.

Figure 16:
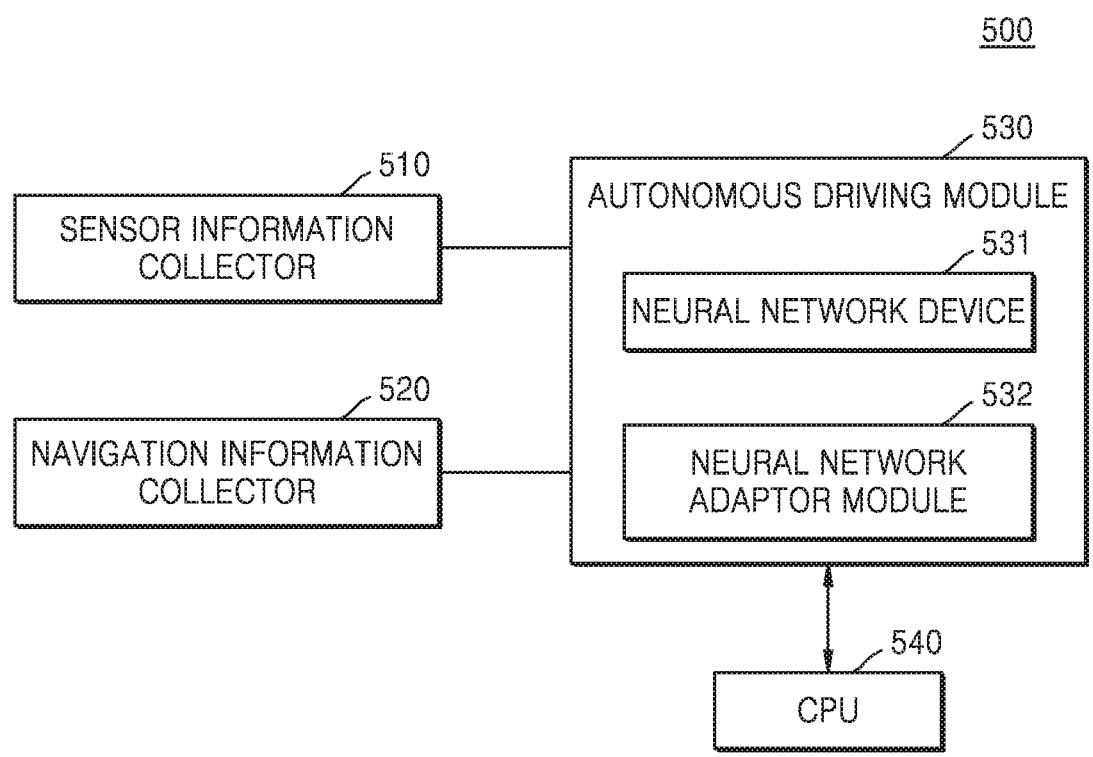
FIG. 16 is a block diagram for illustrating an example in which a neural network adaptor module is implemented in an autonomous driving module.

According to at least some example embodiments of the inventive concepts, one or both of the processor 110 and the processor 410 may be, for example, a hardware-implemented data processing device having circuitry that is physically structured to execute desired operations including, for example, operations represented as code and/or instructions included in a program. Examples of the above-referenced hardware-implemented data processing device include, but are not limited to, a microprocessor, a central processing unit (CPU), a processor core, a multi-core processor; a multiprocessor, an application-specific integrated circuit (ASIC), and a field programmable gate array (FPGA). Processors executing program code are programmed processors, and thus, are special-purpose computers FIG. 16 is a block diagram for illustrating an example in which a neural network adaptor module according to at least one example embodiment of the inventive concepts is implemented in an autonomous driving module used in a motor vehicle. A system illustrated in FIG. 16 may be an autonomous driving system 500. The autonomous driving system 500 may include a sensor information collector 510, a navigation information collector 520, an autonomous driving module 530, and a CPU 540. The autonomous driving module 530 may include a neural network device 531 and a neural network adaptor module 532.

The neural network device 531 may perform neural network operation using image information and speech information and generate information signals, such as an image recognition result and a speech recognition result, based on the operation result. The sensor information collector 510 may include devices, such as a camera and a microphone, which collect image information and speech information and may provide the collected information to the autonomous driving module 530. The navigation information collector 520 may provide various kinds of information (e.g., position information) involved in vehicle driving to the autonomous driving module 530. The neural network device 531 may generate the information signals by executing various kinds of neural network models based on the information input from the sensor information collector 510 and/or the navigation information collector 520.

The neural network adaptor module 532 may reshape a neural network model, according to one or more example embodiments of the inventive concepts. The neural network adaptor module 532 may generate a reshaped neural network model based on static information and/or dynamic information of at least one dedicated processor (not shown) which may be provided inside or outside the autonomous driving module 530. The neural network device 531 may execute the reshaped neural network model.

As described above, according to at least one example embodiment of the inventive concepts, various kinds of neural network models are tailored or, alternatively, optimized for particular dedicated HW, so that operating efficiency of a neural network model is increased.

In addition, a particular neural network model is tailored or, alternatively, optimized for various kinds of dedicated HW, so that operating efficiency of the neural network model is increased.

Example embodiments of the inventive concepts having thus been described, it will be obvious that the same may be varied in many ways. Such variations are not to be regarded as a departure from the intended spirit and scope of example embodiments of the inventive concepts, and all such modifications as would be obvious to one skilled in the art are intended to be included within the scope of the following claims.

What is claimed is:

1. A method of operating a neural network system, the method comprising:
   parsing, by a processor, at least one item of information related to a neural network operation from an input neural network model;
   determining, by the processor, information of at least one dedicated hardware device, the at least one dedicated hardware device configured to operate according to at least one of
      a weight stationary dataflow type by spatially accumulating partial sums across processing elements (PEs) in a PE array, or
      an output stationary dataflow type by broadcasting a corresponding weight to PEs in the PE array;
   generating, by the processor, a reshaped neural network model by changing information of the input neural network model according to a result of determining the information of the at least one dedicated hardware device such that the reshaped neural network model is tailored for execution by the at least one dedicated hardware device;

executing the reshaped neural network model by operating the at least one dedicated hardware device to transmit weights of the reshaped neural network model through the processing elements in the PE array of the at least one dedicated hardware device in response to determining that a first dataflow type of the at least one dedicated hardware device is the output stationary dataflow type; and executing the reshaped neural network model by operating the at least one dedicated hardware device to transmit partial sums of the reshaped neural network model through the processing elements in the PE array of the at least one dedicated hardware device and accumulate the partial sums in the processing elements, in response to determining that the first dataflow type of the at least one dedicated hardware device is the weight stationary dataflow type, wherein the at least one item of information includes a first reuse mode of the input neural network model, wherein the information of the at least one dedicated hardware device includes the first dataflow type of the at least one dedicated hardware device, wherein the generating of the reshaped neural network model includes changing the first reuse mode of the input neural network model into a filter reuse mode of the reshaped neural network model, in response to a determination that the first dataflow type of the at least one dedicated hardware device is the weight stationary dataflow type where each of the corresponding weights is read from a random access memory into a processing element of the PE array and is stationary for further accesses, and changing the first reuse mode of the input neural network model into a feature map reuse mode of the reshaped neural network model, in response to a determination that the first dataflow type of the at least one dedicated hardware device is the output stationary dataflow type where an accumulation of partial sums is maintained for a same output activation value to reduce energy consumption of reading and writing partial sums, and wherein the changing of the first reuse mode is based on the first dataflow type such that a performance of the at least one dedicated hardware device is improved.

2. The method of claim 1, wherein the information of the at least one dedicated hardware device includes at least one item among, computing resource information as static information before the input neural network model is executed, and computing context information as dynamic information generated during runtime of the input neural network model.

3. The method of claim 2, wherein the computing resource information includes at least one of, operation method information,
kernel structure information,
dataflow information, or
data reuse information of the at least one dedicated hardware device.

4. The method of claim 2, wherein the computing context information includes at least one of, information related to execution of the input neural network model during runtime, information about a change in computing resource status with respect to the at least one dedicated hardware device during runtime, or information about an application executed during runtime.

5. The method of claim 1, further comprising:

providing, by the processor, a user interface for a user of an electronic system employing the neural network system; and receiving at least one item of user selection information through the user interface, wherein the generating of the reshaped neural network model further includes changing the information of the input neural network model by further using the at least one item of user selection information.

6. The method of claim 5, further comprising:

assigning, by the processor, the reshaped neural network model to a dedicated hardware device selected by the user, wherein the at least one item of user selection information includes information indicating a kind of the dedicated hardware device by which the input neural network model is to be executed.

7. The method of claim 1, wherein the generating of the reshaped neural network model comprises:

generating N reshaped neural network models from the input neural network model, the N reshaped neural network models respectively corresponding to N different dedicated hardware devices, N being an integer greater than 1.

8. The method of claim 1, wherein the generating of the reshaped neural network model comprises:

generating the reshaped neural network model from N different neural network models, the reshaped neural network model corresponding to a particular dedicated hardware device, N being an integer greater than 1.

9. The method of claim 1, wherein, the parsing of the at least one item of information comprises:

parsing, from the input neural network model, at least one of,
layer topology information,
kernel information,
data characteristic information, or
compression method information; and the generating of the reshaped neural network model includes changing the parsed at least one item of information.

10. The method of claim 1, further comprising:

determining, by a processor, a kind of an application currently being executed during runtime of the input neural network model, wherein the reshaped neural network model is generated by changing accuracy of the input neural network model according to a result of determining the kind of the application.

11. The method of claim 10, further comprising:

executing the input neural network model using a first hardware device before generating the reshaped neural network model, wherein a kernel size used in an operation of the first hardware device is different from a kernel size used in an operation of the at least one dedicated hardware device.

12. An application processor comprising:

memory storing computer-executable instructions; and a processor configured to execute the computer-executable instructions such that the processor is configured to perform operations including, parsing at least one item of information related to a neural network operation from an input neural network model, determining information of at least one dedicated hardware device, the at least one dedicated hardware device configured to operate according to at least one of
- a weight stationary dataflow type by spatially accumulating partial sums across processing elements (PEs) in a PE array, or
- an output stationary dataflow type by broadcasting a corresponding weight to PEs in the PE array, generating a reshaped neural network model by changing information of the input neural network model according to a result of determining the information of the at least one dedicated hardware device, executing the reshaped neural network model by operating the at least one dedicated hardware device to transmit weights of the reshaped neural network model through the processing elements in the PE array of the at least one dedicated hardware device in response to determining that a first dataflow type of the at least one dedicated hardware device is the output stationary dataflow type, and executing the reshaped neural network model by operating the at least one dedicated hardware device to transmit partial sums of the reshaped neural network model through the processing elements in the PE array of the at least one dedicated hardware device and accumulate the partial sums in the processing elements, in response to determining that the first dataflow type of the at least one dedicated hardware device is the weight stationary dataflow type, wherein the at least one item of information includes a first reuse mode of the input neural network model, wherein the information of the at least one dedicated hardware device includes the first dataflow type of the at least one dedicated hardware device, and wherein the generating of the reshaped neural network model includes
- changing the first reuse mode of the input neural network model into a filter reuse mode of the reshaped neural network model, in response to a determination that the first dataflow type of the dedicated hardware device is a weight stationary dataflow type where each of the corresponding weights is read from a random access memory into a processing element of the PE array and is stationary for further accesses, and
- changing the first reuse mode of the input neural network model into a feature map reuse mode of the reshaped neural network model, in response to a determination that the first dataflow type of the dedicated hardware device is an output stationary dataflow type where an accumulation of partial sums is maintained for a same output activation value to reduce energy consumption of reading and writing partial sums, and wherein the changing of the first reuse mode is based on the first dataflow type such that a performance of the at least one dedicated hardware device is improved.

13. The application processor of claim 12, wherein the processor is further configured to execute the computer-executable instructions such that, the parsed at least one item of information includes kernel size information related to a convolution operation of the input neural network model, and the processor generates the reshaped neural network model by changing a kernel size according to a dedicated processor to which the reshaped neural network model will be assigned.

14. The application processor of claim 12, wherein the processor is further configured to, determine at least one item among,
- data reuse information of the reshaped neural network model, and
- layer type information of the reshaped neural network model, execute the computer-executable instructions such that the processor is configured to assign the reshaped neural network model to one of a plurality of dedicated hardware devices according to a result of.

15. A neural network system comprising:

a neural network adaptor module configured to,
- receive a first neural network model,
- determine information parsed from the first neural network model and information of a first dedicated hardware device, the first dedicated hardware device configured to operate according to at least one of
  - a weight stationary dataflow type by spatially accumulating partial sums across processing elements (PEs) in a PE array, or
  - an output stationary dataflow type by broadcasting a corresponding weight to PEs in the PE array,
- generate a second neural network model by changing the first neural network model based on a result of the determining, the second neural network model being assigned to the first dedicated hardware device,
- execute the second neural network model by operating the first dedicated hardware device to transmit weights of the second neural network model through the processing elements in the PE array of the first dedicated hardware device is the output stationary dataflow type, and
- executing the second neural network model by operating the first dedicated hardware device to transmit partial sums of the second neural network model through the processing elements in the PE array of the first dedicated hardware device and accumulate the partial sums in the processing elements, in response to determining that the dataflow type of the first dedicated hardware device is the weight stationary dataflow type; and a neural network device including the first dedicated hardware device, the neural network device configured to perform an operation on input data according to the second neural network model to generate an information signal, the determining including determining dynamic information, the dynamic information including information related to execution of an input neural network model during runtime, and the generating of the second neural network model including changing a performance level of the first neural network model based on the determined dynamic information, the changing of the performance level including approximating a two-dimensional filter of the first neural network model as one or more one-dimensional filters in the second neural network model, the changing of the first neural network model based on the result of the determining including,
- changing a reuse mode of the first neural network model into a filter reuse mode of the second neural network model in response to the first dedicated hardware device operating according to the weight stationary dataflow type, and changing the reuse mode of the first neural network model into a feature map reuse mode of the second neural network model in response to the first dedicated hardware device operating according to the output stationary dataflow type.

16. The neural network system of claim 15, wherein the neural network adaptor module is configured to, parse various items of information including kernel size information from the first neural network model, manage at least one item of information among static information of at least one hardware device, the static information including, operation method information, kernel structure information, dataflow information, and data reuse information of the at least one hardware device; and generate the second neural network model by using, at least one of the parsed various items of information, and the at least one item of information among the static information of at least one hardware device.

17. The neural network system of claim 15, wherein the neural network adaptor module is configured to, parse various items of information comprising kernel size information from the first neural network model, provide, using a user application programming interface (API), a user interface for a user of an electronic system employing the neural network system, receive, via the API, at least one item of user selection information, manage information regarding execution of the first neural network model and information about a change in computing resource status of at least one hardware device during runtime; and generate the second neural network model using, at least one of the parsed various items of information, the at least one item of user selection information, and at least one of the information regarding execution of the first neural network model and the information about a change in computing resource status of at least one hardware device during runtime.

18. The neural network system of claim 15, further comprising:

a processor configured to execute the neural network adaptor module, wherein the neural network adaptor module includes programs for reshaping the first neural network model to generate the second neural network model.

19. The neural network system of claim 15, wherein the changing of the performance level of the first neural network model includes changing the performance level by changing a size of a first kernel applied to the first neural network model.

20. The neural network system of claim 15, wherein the dynamic information includes a type of application executed using the first neural network model during runtime.

21. The neural network system of claim 20, wherein the changing of the performance level of the first neural network model includes reducing the performance level based on the type of application executed using the first neural network model during runtime.

* * * * *